(12) United States Patent
Makino et al.

(10) Patent No.: US 8,441,161 B2
(45) Date of Patent: May 14, 2013

(54) ELECTRIC MOTOR DRIVE DEVICE

(75) Inventors: Tomoaki Makino, Iwata (JP); Fumihiro Isobe, Iwata (JP); Ken Yamamoto, Iwata (JP)

(73) Assignee: NTN Corporation, Osaka (JP)

( * ) Notice: Subject to any disclaimer, the term of this patent is extended or adjusted under 35 U.S.C. 154(b) by 224 days.

(21) Appl. No.: 13/121,716

(22) PCT Filed: Sep. 7, 2009

(86) PCT No.: PCT/JP2009/065585
§ 371 (c)(1),
(2), (4) Date: Mar. 30, 2011

(87) PCT Pub. No.: WO2010/041531
PCT Pub. Date: Apr. 15, 2010

(65) Prior Publication Data
US 2011/0175475 A1    Jul. 21, 2011

(30) Foreign Application Priority Data

Oct. 6, 2008   (JP) .................... 2008-259828
Oct. 24, 2008  (JP) .................... 2008-274724
Oct. 29, 2008  (JP) .................... 2008-277809

(51) Int. Cl.
*H02K 7/10*        (2006.01)
(52) U.S. Cl.
USPC .............................. 310/78; 310/76
(58) Field of Classification Search .......... 310/76–78, 310/92–100
See application file for complete search history.

(56) References Cited

U.S. PATENT DOCUMENTS

| | | | | |
|---|---|---|---|---|
| 3,589,485 | A | * | 6/1971 | Kajitani et al. ............. 192/18 B |
| 4,410,819 | A | * | 10/1983 | Kobayashi et al. ........... 310/105 |
| 5,804,935 | A | * | 9/1998 | Radev ............................ 318/139 |
| 5,959,385 | A | * | 9/1999 | Kato et al. .................... 310/112 |
| 5,966,989 | A | | 10/1999 | Reed, Jr. et al. |
| 6,005,358 | A | * | 12/1999 | Radev ............................ 318/139 |
| 6,155,126 | A | * | 12/2000 | Vogt et al. ....................... 74/335 |
| 6,333,577 | B1 | * | 12/2001 | Kusumoto et al. ......... 310/102 R |
| 7,211,025 | B2 | * | 5/2007 | Fujioka .............................. 477/8 |
| 8,100,239 | B2 | * | 1/2012 | Swanson et al. ............. 192/48.2 |

FOREIGN PATENT DOCUMENTS

| | | |
|---|---|---|
| CN | 101204924 | 6/2008 |
| CN | 101204925 | 6/2008 |
| JP | 51-30246 | 7/1976 |
| JP | 53-102458 | 9/1978 |
| JP | 56-1007 | 1/1981 |
| JP | 59-155645 | 9/1984 |
| JP | 2002-48197 | 2/2002 |
| JP | 2006-22879 | 1/2006 |
| JP | 2006-528100 | 12/2006 |

* cited by examiner

*Primary Examiner* — Thanh Lam
(74) *Attorney, Agent, or Firm* — Clark & Brody

(57) ABSTRACT

An electric motor drive device (1) includes a motor (11), a speed reducing part (31) to reduce speed of a rotation outputted from the motor (11) and transmit it to the side of a wheel, and a connection/disconnection part (21) to disconnect or connect rotation transmission of the speed reducing part, a motor side rotation member (18) serving as an input shaft to input the rotation from the motor (11), an output shaft (34) to output the rotation to the side of the wheel, a double shaft (33) arranged coaxially with the input shaft and including a tube-shaped outer side rotation shaft (33o) and an inner side rotation shaft (33i) inserted into the outer side rotation shaft.

18 Claims, 7 Drawing Sheets

ELECTRIC MOTOR DRIVE DEVICE

TECHNICAL FIELD

The present invention relates to an electric motor drive device including an electric motor as a power source, reducing speed of an output of the electric motor, and transmitting it to a wheel.

BACKGROUND ART

A conventional electric motor drive device used in a drive device of an electric car and a hybrid vehicle is disclosed in a Japanese Unexamined Patent Publication No. 2006-22879 (patent document 1). The electric motor drive device disclosed in the patent document 1 includes an electric motor, a first speed reducing part to reduce speed of an output of the electric motor with a high speed reduction ratio, a second speed reducing part to reduce the speed of the output of the electric motor with a low speed reduction ratio, and first and second intermittent means provided in the first and second speed reducing parts, respectively, to selectively disconnect the first or second speed reducing parts. The electric motor drive device is provided with a first shaft to transmit output torque of the electric motor, and a second shaft arranged parallel to the first shaft, and the first speed reducing part has a first gear arranged in the first shaft in an integrally rotatable manner, and a second gear arranged in the second shaft in a relatively rotatable manner. In addition, the second speed reducing part has a third gear arranged in the first shaft in a relatively rotatable manner, and a fourth gear arranged in the second shaft in an integrally rotatable manner. Thus, the first intermittent means is a two-way overrunning clutch to make a connection/disconnection between the second shaft and the second gear, and the second intermittent means is a multiplate friction clutch to make a connection/disconnection between the first shaft and the third gear.

RELATED ART DOCUMENT

Patent Document patent document 1: Japanese Unexamined Patent Publication No. 2006-22879

SUMMARY OF THE INVENTION

However, the above conventional electric motor drive device has the following problems. That is, it is difficult to provide the two separate clutches in each of the second shaft and the first shaft due to space limitations of a vehicle. In addition, the electric motor drive device becomes problematically large.

It is an object of the present invention to provide an electric motor drive device capable of satisfying space limitations of a vehicle, in view of the above circumstances.

An electric motor drive device according to the present invention made in order to attain the object includes a motor to rotate and drive a motor side rotation member, a speed reducing part to reduce speed of a rotation of the motor side rotation member and transmit it to the side of a wheel, and a connection/disconnection part to disconnect or connect rotation transmission of the speed reducing part. The speed reducing part has an input shaft to input the rotation from the motor, an output shaft to output the rotation to the side of the wheel, a double shaft arranged coaxially with the one of the input shaft and the output shaft and including a tube-shaped outer side rotation shaft and an inner side rotation shaft inserted into the outer side rotation shaft, an opposite-side shaft connected to the other one of the input shaft and the output shaft, a first speed reducing part including a plurality of rotation elements to reduce speed of the rotation on the side of the motor with a first speed reduction ratio, between one of the outer side rotation shaft and the inner side rotation shaft, and the opposite-side shaft and transmit it to the side of the wheel, and a second speed reducing part including a plurality of rotation elements to reduce the speed of the rotation on the side of the motor with a second speed reduction ratio, different from the first speed reduction ratio, between the other one of the outer side rotation shaft and the inner side rotation shaft, and the opposite-side shaft and transmit it to the side of the wheel. In addition, the connection/disconnection part has an inner side rotation shaft clutch to disconnect or connect rotation transmission between the inner side rotation shaft and the input shaft or the output shaft coaxially arranged with each other, and an outer side rotation shaft clutch to disconnect or connect rotation transmission between the outer side rotation shaft and the input shaft or the output shaft coaxially arranged with each other.

According to the present invention, since the shaft on the input shaft side or the shaft on the output shaft side of the speed reducing part has the double shaft structure including the outer side rotation shaft and the inner side rotation shaft, the two clutches of the connection/disconnection part can be arranged on the double shaft, which is advantageous to the space limitations of the vehicle. Therefore, the electric motor drive device can be miniaturized.

As one embodiment, the input shaft of the speed reducing part is coaxially arranged with the double shaft, the opposite-side shaft extends parallel to the double shaft, the output shaft of the speed reducing part is connected to the opposite-side shaft, the inner side rotation shaft clutch disconnects or connects rotation transmission between the inner side rotation shaft of the double shaft and the input shaft, and the outer side rotation shaft clutch disconnects or connects rotation transmission between the outer side rotation shaft of the double shaft and the input shaft.

According to the above embodiment, since the input shaft of the speed reducing part and the double shaft are coaxially arranged, the two clutches of the connection/disconnection part can be coaxially arranged with the input shaft. Therefore, coaxial arrangement can be implemented from the output shaft of the motor to the double shaft, so that the electric motor drive device can be miniaturized.

The present invention is not limited to the one embodiment, and the motor, the connection/disconnection part, and the speed reducing part may be arranged in any order in an axial direction of the double shaft. For example, the connection/disconnection part, the motor, and the speed reducing part may be arranged in this order, or the connection/disconnection part, the speed reducing part, and the motor may be arranged in this order. Preferably, the motor, the connection/disconnection part, and the speed reducing part are arranged in this order in the axial direction of the double shaft. According to this embodiment, since the motor, the connection/disconnection part, and the speed reducing part are aligned in this order in the arrangement layout, they can be aligned with the same order of the engine, the torque converter, and the automatic transmission in the conventional layout. Therefore, the electric motor drive device can be easily mounted on the existing vehicle space.

Here, preferably, the speed reducing part further has a third speed reducing part including a plurality of rotation elements to reduce the speed of the rotation on the side of the motor with a third speed reduction ratio different from the first speed reduction ratio and the second speed reduction ratio, between the one of the outer side rotation shaft and the inner side rotation shaft, and the opposite-side shaft and transmit it to the side of the wheel. According to this embodiment, since the first to third speed reducing parts each having the different speed reduction ratio are provided, the electric motor can be operated at highly efficient rotation speed, in response to low-speed running, middle-speed running, and high-speed running, so that energy efficiency is considerably improved.

Preferably, the inner side rotation shaft clutch has a first motor side friction element integrally rotating with the input shaft, a first shaft side friction element integrally rotating with the inner side rotation shaft, and a first pressure member to press one of the first shaft side friction element and the first motor side friction element against the other thereof to fasten them, and the outer side rotation shaft clutch has a second motor side friction element integrally rotating with the input shaft, a second shaft side friction element integrally rotating with the outer side rotation shaft, and a second pressure member to press the one of the second shaft side friction element and the second motor side friction element against the other thereof to fasten them. According to this embodiment, a power transmission passage to transmit the power from the electric motor to the wheel side through the inner side rotation shaft or the outer side rotation shaft can be switched by switching the friction elements. Therefore, the present invention can eliminate the shock which is generated due to the switching between the first and second clutches in the case where the two-way clutch is used in the electric motor drive device according to the patent document 1.

Preferably, the speed reducing part provided astride the double shaft and the opposite-side shaft has a smaller outer diameter dimension on the side of the double shaft than an outer diameter dimension of the connection/disconnection part provided coaxially with the double shaft. The connection/disconnection part further has an actuator to operate the first pressure member and the second pressure member, and the actuator is arranged on the outer diameter side of the speed reducing part provided around the double shaft. According to this embodiment, the actuator can be arranged in a radially stepped region formed between the connection/disconnection part having the large radial dimension around the double shaft, and the speed reducing part having the relatively small diameter on the side of the double shaft, so that the arrangement layout of the actuator can be optimal in the electric motor drive device, so that the electric motor drive device can be easily mounted on the vehicle.

Preferably, the first pressure member and the second pressure member are provided as one surface and the other surface of a common pressure disk, the first motor side friction element and the first shaft side friction element are arranged on the one surface side of the pressure disk, the second motor side friction element and the second shaft side friction element are arranged on the other surface side of the pressure disk, and the connection/disconnection part further has an actuator to move the pressure disk to the one surface side and the other surface side.

According to this embodiment, since the first clutch is arranged on the one surface side of the pressure disk, and the second clutch is arranged on the other surface side of the pressure disk, the first and second speed reducing parts can be switched by moving the common pressure disk by the one actuator. Therefore, the electric motor drive device can be further miniaturized and considerably advantageous to the space limitations of the vehicle.

Preferably, the speed reducing part provided astride the double shaft and the opposite shaft has a smaller outer diameter dimension on the side of the double shaft than an outer diameter dimension of the connection/disconnection part provided coaxially with the double shaft, and the actuator is arranged on the outer diameter side of the speed reducing part provided around the double shaft, and arranged in roughly the same position as the speed reducing part in an axial direction. According to this embodiment, the arrangement layout of the actuator can be neat, the electric motor drive device can be further miniaturized. Therefore, the electric motor drive device can be more easily mounted on the vehicle.

The present invention is not limited to the one embodiment, the inner side rotation shaft is formed into a tube shape, the input shaft projects from the motor to the axial one side and is inserted to the inner side rotation shaft, the inner side rotation shaft clutch is provided in an end part of the inner side rotation shaft on the side distant from the motor, and the outer side rotation shaft clutch is provided in an end part of the outer side rotation shaft on the side distant from the motor. According to this embodiment, the input shaft of the speed reducing part projects from the motor to the axial one side and is inserted in the inner side rotation shaft and the outer side rotation shaft, and the inner side rotation shaft clutch is provided at the end part of the inner side rotation shaft on the side distant from the motor, and the outer side rotation shaft clutch is provided at the end part of the outer side rotation shaft on the side distant from the motor.

Thus, the first speed reducing part can be provided at the end part of the inner side rotation shaft on the side close to the motor, and the second speed reducing part can be provided at the end part of the outer side rotation shaft on the side close to the motor. Therefore, the motor, the speed reducing part, and the connection/disconnection part can be sequentially arranged in the axial direction of the motor, and the speed reducing part can be arranged in the center of the electric motor drive device. Therefore, the differential gear device to distribute the output of the speed reducing part to the right and left wheels can be arranged in the center of the vehicle in its width direction, so that weight balance of the vehicle can be improved.

In addition, as another embodiment of the electric motor drive device according to the preset invention, the output shaft of the speed reducing part is arranged coaxially with the double shaft, the opposite-side shaft extends parallel to the double shaft, the input shaft is connected to the output shaft of the motor at its one end and connected to the opposite-side shaft at its other end, the inner side rotation shaft clutch disconnects or connects rotation transmission between the inner side rotation shaft and the output shaft, and the outer side rotation shaft clutch disconnects or connects rotation transmission between the outer side rotation shaft and the output shaft.

According to another embodiment, since the output shaft of the speed reducing part and the double shaft are coaxially arranged, the two clutches of the connection/disconnection part can be coaxially arranged with the output shaft of the speed reducing part. Therefore, the electric motor drive device can be miniaturized.

Furthermore, the speed reducing part has the first speed reducing part to reduce the speed of the rotation of the opposite-side shaft with the first reduction ratio and transmit it to the outer side rotation shaft, and the second speed reducing part to reduce the speed of the rotation of the opposite-side shaft with the second reduction ratio different from the first reduction ratio and transmit it to the inner side rotation shaft, so that the rotation speed of the double shaft can be smaller than the motor rotation speed, which can reduce the burden on an oil seal provided in each of the outer side rotation shaft and the inner side rotation shaft having the double shaft structure.

In addition, since the rotation speed of the double shaft is smaller than the rotation speed of the motor, a bearing loss, gear loss, and oil seal contact loss can be small, so that meshing vibration can be prevented in the gear.

In addition, since the rotation speed of the connection/disconnection part is smaller than the rotation speed of the motor, it is not necessary to increase centrifugal strength of the connection/disconnection part, which is advantageous to a design, and unbalance vibration of the connection/disconnection part can be avoided.

The positional relationship between the output shaft of the motor and the input shaft of the speed reducing part is not limited in particular. Preferably, the input shaft of the speed reducing part is connected to the output shaft of the motor. According to this embodiment, since the motor, the speed reducing part, and the connection/disconnection part can be arranged in this order in the axial direction of the motor, the speed reducing part and the connection/disconnection part can be collectively provided on the one side in one axial direction of the motor. Therefore, it is advantageous to the space limitations of the vehicle, and the electric motor drive device can be miniaturized. In addition, since the motor and the speed reducing part can be adjacently arranged, the inner side of the motor can be cooled by the oil cooling by introducing the lubricant oil passing through the speed reducing part into the motor.

Preferably, one end part of the double shaft is arranged in axially the same position as the opposite-side shaft, and the other end part of the double shaft extends in a direction away from the motor, the first speed reducing part and the second speed reducing part are arranged in the one end part of the double shaft, the connection/disconnection part is arranged in the other end part of the double shaft, and the inner side rotation shaft of the double shaft is formed into a tube shape, and the output shaft is inserted in the tube-shaped inner side rotation shaft and projects from the one end of the inner side rotation shaft. Thus, the output shaft is projected from the one end of the double shaft and extended so as to penetrate the first speed reducing part and the second speed reducing part, so that the end of the output shaft of the speed reducing part can be arranged between the motor and the connection/disconnection part. Thus, the motor, the speed reducing part, and the connection/disconnection part can be arranged in this order in the axial direction of the motor, and the decelerated rotation outputted from the speed reducing part can be extracted from the part between the motor and the speed reducing part and transmitted to the wheel side. Therefore, the arrangement balance can be improved in the drive shaft connected to each wheel to distribute the reduced rotation to the wheel.

In addition, the outer side rotation shaft clutch has a first drive side friction element integrally rotating with the outer side rotation shaft, a first driven side friction element integrally rotating with the opposite-side shaft, and a first pressure member to press one of the first drive side friction element and the first driven side friction element against the other thereof to fasten them, and the inner side rotation shaft clutch has a second drive side friction element integrally rotating with the inner side rotation shaft, a second driven side friction element integrally rotating with the opposite-side shaft, and a second pressure member to press one of the second drive side friction element and the second driven side friction element against the other thereof to fasten them. According to this embodiment, a power transmission passage to transmit the power from the electric motor to the wheel side through the inner side rotation shaft or the outer side rotation shaft can be switched by switching the friction elements. Therefore, the present invention can eliminate the shock which is generated due to the switching between the first and second clutches in the case where the two-way clutch is used in the electric motor drive device according to the patent document 1.

Preferably, the first pressure member and the second pressure member are provided as one surface and the other surface of a common pressure disk, the first drive side friction element and the first driven side friction element are arranged on the one surface side of the pressure disk, the second drive side friction element and the second driven side friction element are arranged on the other surface side of the pressure disk, and the connection/disconnection part further has an actuator to move the pressure disk to the one surface side and to the other surface side. According to this embodiment, the first and second speed reducing parts can be switched by moving the common pressure disk by the one actuator. Therefore, the electric motor drive device can be further miniaturized and considerably advantageous to the space limitations of the vehicle.

Preferably, the actuator is arranged on the side distant from the speed reducing part, of axial both sides of the connection/disconnection part. According to this embodiment, the actuator is arranged at the one end part of the electric motor drive device, so that assembly efficiency of the electric motor drive device can be improved.

Alternatively, the actuator is arranged between the connection/disconnection part and the speed reducing part. According to this embodiment, the actuator is incorporated in the middle part of the electric motor drive device, and the space limitations of the vehicle can be satisfied.

The present invention is not limited to the one embodiment, and the first driven side friction element and the second driven side friction element are provided as one surface and the other surface of a common center plate, the first drive side friction element and the first pressure member are arranged on the one surface side of the center plate, and the second drive side friction element and the second pressure member are arranged on the other surface side of the center plate. Thus, the electric motor drive device can be further miniaturized, and it is more advantageous to the space limitations of the vehicle.

Preferably, the connection/disconnection part further has a first actuator to operate the first pressure member, and a second actuator to operate the second pressure member, and the first actuator and the second actuator are arranged between the connection/disconnection part and the speed reducing part. Thus, the actuator is incorporated in the middle part of the electric motor drive device, and the space limitations of the vehicle can be satisfied.

EFFECT OF THE INVENTION

According to the present invention, since the shaft on the output shaft side or the shaft on the input shaft side of the speed reducing part includes the annular outer side rotation shaft and the inner side rotation shaft inserted into the outer side rotation shaft, the first clutch and the second clutch can be collectively arranged on the shaft on the output shaft side or the shaft on the input shaft side. Therefore, the electric motor drive device can be miniaturized, and the electric motor drive device can be advantageous to the space limitations of the vehicle.

EMBODIMENTS OF THE INVENTION

Figure 1:
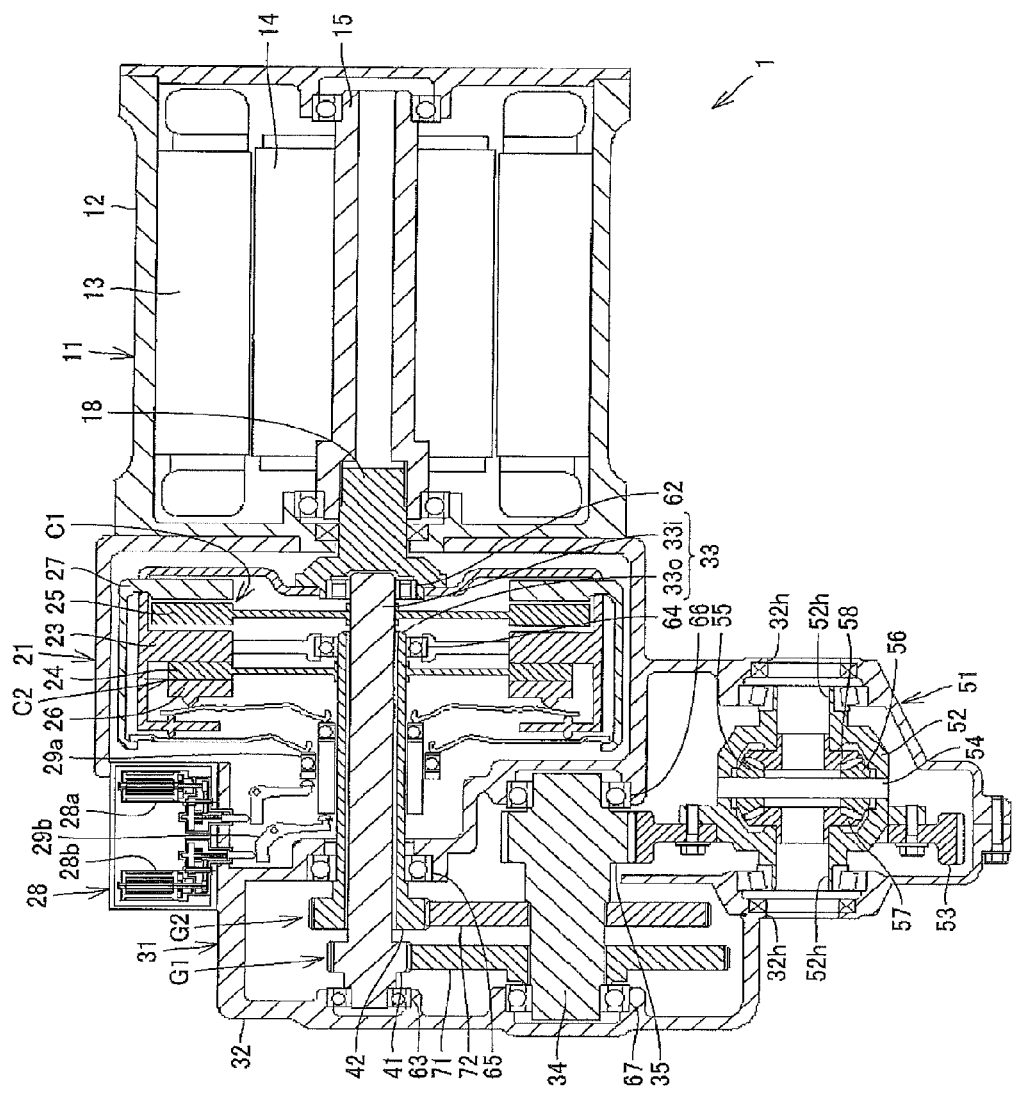
FIG. 1 is a main part development cross-sectional view showing an electric motor drive device according to a first working example.

Hereinafter, embodiments of the present invention will be described in detail, based on working examples shown in the drawings. In first to fifth working examples of the present invention, a shaft on the side of an input shaft is a double shaft in a speed reducing part of an electric motor drive device. Meanwhile, in sixth and seventh working examples of the present invention, a shaft on the side of an output shaft is a double shaft.

FIG. 1 is a main part development cross-sectional view showing an electric motor drive device according to the first working example of the present invention. The electric motor drive device 1 according to the first working example includes a motor 11, a connection/disconnection part 21, and a speed reducing part 31. The motor 11 is a radial gap motor including a stator 13 fixed to a motor casing 12, a rotor 14 arranged so as to be opposed to the inner side of the stator 13 with a radially open gap interposed therebetween, a motor output shaft 15 fixedly connected to the inner side of the rotor 14 and integrally rotating with the rotor 14. The motor output shaft 15 serves as a rotation shaft of an electric motor and outputs a rotation to the speed reducing part 31.

The motor casing 12 is connected to a casing 32 on one axial end side of the motor 11. The motor output shaft 15 is rotatably supported by the motor casing 12 at each end, and one end of the motor output shaft 15 is connected to one end of a motor side rotation member 18. The other end of the motor side rotation member 18 projects from the motor casing 12 and is connected to a center plate 23 of the connection/disconnection part 21. The center plate 23 is provided coaxially with the motor side rotation member 18, and integrally rotates with the motor side rotation member 18. Since the motor side rotation member 18 receives the rotation from the motor 11, it corresponds to an input shaft of the speed reducing part 31. The other end of the motor side rotation member 18 projecting from the motor 11 is arranged so as to coaxially abut on one end of a first shaft 33. The first shaft 33 is a double shaft including an annular outer side rotation shaft 33o and an inner side rotation shaft 33i inserted in the outer side rotation shaft 33o.

The connection/disconnection part 21 includes a first clutch C1 and a second clutch C2 arranged inside the casing 32. The center plate 23 is formed into a disk shape having a friction material on each surface and has a center hole. A first clutch disk 25 having a friction material, and a first pressure disk 27 are sequentially arranged on one surface side of the center plate 23. The first clutch disk 25 is mounted on one end of the inner side rotation shaft 33i, and rotates integrally. The center plate 23, the first clutch disk 25, and the first pressure disk 27 function as the first clutch C1. The one surface side of the center plate 23 corresponds to a first motor side friction element. The first clutch disk 25 corresponds to a first shaft side friction element. The first pressure disk 27 corresponds to a first pressure member.

A second clutch disk 24 having a friction material, and a second pressure disk 26 are sequentially arranged on the other surface side of the center plate 23. The second clutch disk 24 is mounted on one end of the outer side rotation shaft 33o, and rotates integrally. The center plate 23, the second clutch disk 24, and the second pressure disk 26 function as the second clutch C2. The other surface side of the center plate 23 corresponds to a second motor side friction element. The second clutch disk 24 corresponds to a second shaft side friction element. The second pressure disk 26 serves as a second pressure member.

The connection/disconnection part 21 is arranged between the other end of the motor side rotation member 18 and the one end of the first shaft 33 so as to be coaxial with them and disconnects or connects the first clutch C1 and the second clutch C2 as will be described below to disconnect or connect rotation transmission of the speed reducing part 31.

The speed reducing part 31 includes a first speed reducing part G1 and a second speed reducing part G2 arranged inside the casing 32. The first speed reducing part G1 reduces speed of the rotation of the motor side rotation member 18 with a predetermined first speed reduction ratio and transmits it toward a wheel (not shown). The second speed reducing part G2 reduces the speed of the rotation of the motor side rotation member 18 with a second speed reduction ratio smaller than the first reduction ratio and transmits it toward the wheel. When the rotation speed of the motor side rotation member 18 is the same, the rotation speed reduced by the second speed reducing part G2 is higher than the rotation speed reduced by the first speed reducing part G1.

Therefore, the speed reducing part 31 has the first shaft 33 extending coaxially with the motor side rotation member 18, and a second shaft 34 extending parallel to the first shaft 33. Each end of the inner side rotation shaft 33i of the first shaft 33 projects from each end of the outer side rotation shaft 33o, and one end of the inner side rotation shaft 33i is rotatably supported by the other end of the motor side rotation member 18 via a rolling bearing 62. In addition, the other end of the inner side rotation shaft 33i is rotatably supported by the casing 32 via a rolling bearing 63. The one end of the outer side rotation shaft 33o is rotatably supported by the center hole of the center plate 23 via a rolling bearing 64. In addition, the other end of the outer side rotation shaft 33o is rotatably supported by the casing 32 via a rolling bearing 65.

A first drive gear 41 is formed at the other end of the inner side rotation shaft 33i. A second drive gear 42 is formed at the other end of the outer side rotation shaft 33o. A first driven gear 71 and a second driven gear 72 are fixed to the second shaft 34 on the side axially distant from the connection/disconnection part 21. Among radiuses of the gears 41, 42, 71, and 72, the radius of the first drive gear 41 is smallest, and the radiuses of the second drive gear 42, the second driven gear 72, and the first drive gear 71 increase in this order. The first drive gear 41 always meshes with the first driven gear 71, and the gears 41 and 71 function as the first speed reducing part G1. The second drive gear 42 always meshes with the second driven gear 72, and the gears 42 and 72 function as the second speed reducing part G2. Therefore, the first speed reducing part G1 is a gear group having the plurality of gears, and the second speed reducing part G2 is also a gear group.

The one end of the first shaft 33 sequentially penetrates the second pressure disk 26, the second clutch disk 24, the center plate 23, the first clutch disk 25, and the first clutch disk 27, and reaches the motor side rotation member 18. Meanwhile, the one end of the second shaft 34 is adjacent to the connection/disconnection part 21 without penetrating the connection/disconnection part 21, and rotatably supported by the casing 32 via a rolling bearing 66. The other end of the second shaft 34 positioned on the side distant from the connection/disconnection part 21 is rotatably supported by the casing 32 via a rolling bearing 67. The rolling bearing 67 is arranged in axially the same position as the rolling bearing 63.

In addition, a distance between the first shaft 33 and the second shaft 34 is roughly equal to a radius dimension of the connection/disconnection part 21. Thus, a layout of the speed reducing part 31 can be optimal in the electric motor drive device 1, so that the electric motor drive device 1 can be easily mounted on a vehicle.

Consequently, the connection/disconnection part 21 has the first clutch C1 to connect the motor side rotation member 18 to the inner side rotation shaft 33i, and the second clutch C2 to connect the motor side rotation member 18 to the outer side rotation shaft 33o. Thus, the two clutches C1 and C2 are arranged on the first shaft 33.

The second driven gear 72 is arranged in the second shaft 34 on the side distant from the connection/disconnection part 21, and the first driven gear 71 is arranged therein on the side more distant from the connection/disconnection part 21. In addition, a pinion 35 having a diameter smaller than that of the second driven gear 72 is formed in the second shaft 34 on the side close to the connection/disconnection part 21. The pinion 35 always meshes with a ring gear 53 mounted on a differential gear case 52. Since the other end of the second shaft 34 outputs the decelerated rotation toward the wheel, it corresponds to an output shaft of the speed reducing part 31. In addition, the one end of the second shaft 34 corresponds to an opposite-side shaft because the decelerated rotation is transmitted thereto through the first speed reducing part G1 and the second speed reducing part G2.

In addition, a radial dimension of the connection/disconnection part 21 is roughly equal to that of the motor 11. Thus, a layout of the connection/disconnection part 21 can be optimal in the electric motor drive device 1, so that the electric motor drive device 1 can be easily mounted on the vehicle.

The casing 32 is provided with a differential gear device 51. Hereinafter, the differential gear device 51 will be described. A pinion mate shaft 54 is inserted into the gear case 52 so as to be parallel to a rolling surface of the ring gear 53, and a pair of pinion mate gears 55 and 56 rotatably supported on the shaft 54 is arranged in the differential gear case 52. A pair of side gears 57 and 58 which is positioned between the pinion mate gears 55 and 56 and meshes with them is rotatably arranged in the differential gear case 52. A center hole of the one side gear 57 is serration-fit to one drive shaft (not shown). A center hole of the other side gear 58 is serration-fit to another drive shaft (not shown). Therefore, the casing 32 and the differential gear case 52 have holes 32h and 52h on one and the other sides, respectively to allow the shaft to penetrate. In addition, the one and the other drive shafts are connected to right and left wheels (not shown) to drive them, respectively.

An actuator unit 28 is mounted on the casing 32 so as to be adjacent to the connection/disconnection part 21 and the speed reducing part 31. The actuator unit 28 has two actuators 28a and 28b. One actuator 28a is connected to the first pressure disk 27 through a link member 29a. The other actuator 28b is connected to the second pressure disk 26 through a link member 29b.

The actuator unit 28 is arranged in a radially stepped region formed between the connection/disconnection part 21 having a large radial dimension around the first shaft 33, and the speed reducing part 31 having a relatively small diameter and housing the gears 41 and 42 on the side of the first shaft 33. Thus, a layout of the actuator unit 28 can be optimal in the electric motor drive device 1, so that the electric motor drive device 1 can be easily mounted on the vehicle.

Hereinafter, an operation of the above electric motor drive device 1 will be described. When the motor 11 is turned on and the motor side rotation member 18 is driven and rotates, the center plate 23 integrally rotates with the motor side rotation member 18. When the rotation speed of the differential gear device 51 is in a predetermined low-speed rotation region, the actuator unit 28 connects the first clutch C1 and disconnects the second clutch C2, and the rotary drive of the motor 11 is reduced by the first speed reducing part G1 and transmitted to the differential gear device 51. Thus, even when the rotation speed of the differential gear device 51 is in the low-speed region, the rotation speed of the motor 11 can be provided in a highly-efficient region.

Meanwhile, when the rotation speed of the differential gear device 51 is in a predetermined high-speed rotation region, the actuator unit 28 disconnects the first clutch C1 and connects the second clutch C2, and the rotary drive of the motor 11 is reduced by the second speed reducing part G2 and transmitted to the differential gear device 51. Thus, when the rotation speed of the differential gear device 51 is in the high-speed region, the rotation speed of the motor 11 can be provided in a highly-efficient region.

More specifically, when the rotation speed of the differential gear device 51 is in the low-speed rotation region below a predetermined rotation speed, the actuator 28a moves the first pressure disk 27 in an axial direction, and the first pressure disk 27 presses the first clutch disk 25 against the center plate 23. Thus, the first clutch disk 25 and the center plate 23 rotate together and the first clutch C1 transmits rotation torque. Then, the inner side rotation shaft 33i integrally rotates with the first clutch disk 25 and the first drive gear 41 rotates. The rotation speed of the first shaft 33 is reduced by the first driven gear 71 and transmitted to the second shaft 34. The rotation torque of the second shaft 34 is inputted from the pinion 35 to the ring gear 53, and transmitted to the differential gear device 51. At this time, the outer side rotation shaft 33o is rotated by the second driven gear 72, but the second pressure disk 26 is positioned apart from the center plate 23, so that it does not press the second clutch disk 24. While the second clutch disk 24 rotates together with the outer side rotation shaft 33o, it is apart from the center plate 23 and idles. That is, the second clutch C2 does not transmit the rotation torque.

Meanwhile, when the rotation speed of the differential gear device 51 is in the high-speed rotation region above the predetermined rotation speed, the actuator 28b moves the second pressure disk 26 in the axial direction, and the second pressure disk 26 presses the second clutch disk 24 against the center plate 23. Thus, the second clutch disk 24 and the center plate 23 rotate together and the second clutch C2 transmits the rotation torque. Then, the outer side rotation shaft 33o integrally rotates with the second clutch disk 24 and the second drive gear 42 rotates. The rotation speed of the first shaft 33 is reduced by the second driven gear 72 and transmitted to the second shaft 34. The rotation torque of the second shaft 34 is inputted from the pinion 35 to the ring gear 53, and transmitted to the differential gear device 51. At this time, the inner side rotation shaft 33*i* is rotated by the first driven gear 71, but the first pressure disk 27 is positioned apart from the center plate 23, so that it does not press the first clutch disk 25. While the first clutch disk 25 rotates together with the inner side rotation shaft 33*i*, it is apart from the center plate 23 and idles. That is, the first clutch C1 does not transmit the rotation torque.

Since each of the two clutches C1 and C2 is the friction clutch having the friction material, the low-speed region and the high-speed region can be smoothly switched by switching the clutches C1 and C2. Therefore, the present invention can eliminate the shock which is generated due to the switching between the first and second clutches in the case where the two-way clutch is used in the electric motor drive device according to the patent document 1.

Figure 2:
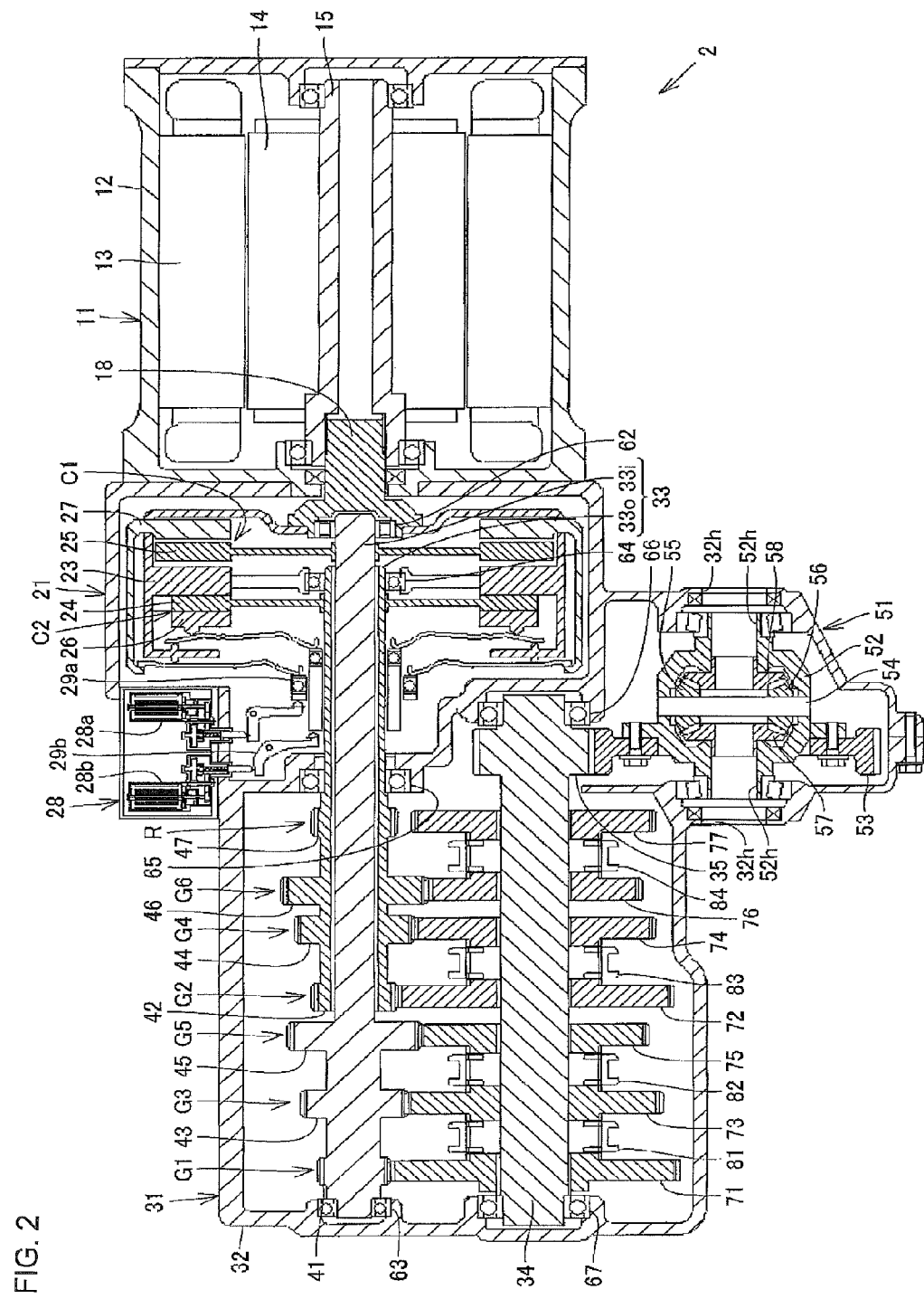
FIG. 2 is a main part development cross-sectional view showing an electric motor drive device according to a second working example.

FIG. 2 is a main part development cross-sectional view showing an electric motor drive device according to a second working example of the present invention. Since a basic configuration of the second working example is in common with that of the first working example, the same member is marked with the common reference, its description is omitted, and a different configuration will be described.

The electric motor drive device 2 according to the second working example differs from the electric motor drive device 1 in that it further has a third speed reducing part G3 to reduce rotation speed of a first shaft 33 with a speed reduction ratio different from a speed reduction ratio of a first speed reducing part G1 and a speed reduction ratio of a second speed reducing part G2, and transmits it to a second shaft 34. Furthermore, a speed reducing part 31 in the second working example has a fourth speed reducing part G4, a fifth speed reducing part G5, a sixth speed reducing part G6, and a reversal speed reducing part R in addition to the first speed reducing part G1, the second speed reducing part G2, and the third speed reducing part G3.

As shown in FIG. 2, in addition to a first drive gear 41, a third drive gear 43 and a fifth drive gear 45 are formed at the other end of an inner side rotation shaft 33*i*. The third drive gear 43 is arranged closer to a connection/disconnection part 21 than the first drive gear 41, and the fifth drive gear 45 is arranged closer to the connection/disconnection part 21 than the third drive gear 43.

In addition to a second drive gear 42, a fourth drive gear 44, a sixth drive gear 46, and a seventh drive gear 47 are formed at the other end of an outer side rotation shaft 33*o*. The fourth drive gear 44 is arranged closer to the connection/disconnection part 21 than the second drive gear 42, the sixth drive gear 46 is arranged closer to the connection/disconnection part 21 than the fourth drive gear 44, and the seventh drive gear 47 is arranged closer to the connection/disconnection part 21 than the sixth drive gear 46.

A first driven gear 71 is coaxially mounted on the second shaft 34 on the side axially distant from the connection/disconnection part 21, and in addition to the first drive gear 71, a third driven gear 73, a fifth driven gear 75, a second driven gear 72, a fourth driven gear 74, a sixth driven gear 76, and a seventh driven gear 77 are sequentially mounted thereon coaxially so as to axially approach the connection/disconnection part 21.

Among radiuses of the gears 41, 42, 43, 44, 45, 46, 47, 71, 72, 73, 74, 75, 76, and 77, the radius of the first drive gear 41 is smallest, and the radiuses of the seventh drive gear 47, the second drive gear 42, the third drive gear 43, the fourth drive gear 44, the fifth drive gear 45, the sixth drive gear 46, the sixth driven gear 76, the fifth driven gear 75, the fourth driven gear 74, the seventh driven gear 77, the third driven gear 73, the second driven gear 72, and the first driven gear 71 increase in this order.

The first drive gear 41 always meshes with the first driven gear 71, and these gears 41 and 71 function as the first speed reducing part G1. The second drive gear 42 always meshes with the second driven gear 72, and these gears 42 and 72 function as the second speed reducing part G2. The third drive gear 43 always meshes with the third driven gear 73, and these gears 43 and 73 function as the third speed reducing part G3. The fourth drive gear 44 always meshes with the fourth driven gear 74, and these gears 44 and 74 function as the fourth speed reducing part G4. The fifth drive gear 45 always meshes with the fifth driven gear 75, and these gears 45 and 75 function as the fifth speed reducing part G5. The sixth drive gear 46 always meshes with the sixth driven gear 76, and these gears 46 and 76 function as the sixth speed reducing part G6. The seventh drive gear 47 always meshes with the seventh driven gear 77 through an idler gear (not shown), and these gears 47 and 77 and the idler gear function as the reversal speed reducing part R.

A synchromesh mechanism 81 is mounted between the first driven gear 71 and the third driven gear 73 so as to be coaxial with the second shaft 34. The synchromesh mechanism 81 integrally rotating with the second shaft 34 axially moves back and forth and selectively engages with the first driven gear 71 or the third driven gear 73, to allow the gear 71 or 73 to integrally rotate with the second shaft 34. Alternatively, it is positioned in an axially neutral position and does not engage with each of the gear 71 and 73, and each of the first driven gear 71 and the third driven gear 73 is separated from the second shaft 34.

A synchromesh mechanism 82 is mounted between the third driven gear 73 and the fifth driven gear 75 so as to be coaxial with the second shaft 34. The synchromesh mechanism 82 integrally rotating with the second shaft 34 axially moves back and forth and selectively engages with the third driven gear 73 or the fifth driven gear 75, to allow the gear 73 or 75 to rotate together with the second shaft 34. Alternatively, it is positioned in an axially neutral position and does not engage with each of the gear 73 and 75, and each of the third driven gear 73 and the fifth driven gear 75 is separated from the second shaft 34.

A synchromesh mechanism 83 is mounted between the second driven gear 72 and the fourth driven gear 74 so as to be coaxial with the second shaft 34. The synchromesh mechanism 83 integrally rotating with the second shaft 34 axially moves back and forth and selectively engages with the second driven gear 72 or the fourth driven gear 74, to allow the gear 72 or 74 to rotate together with the second shaft 34. Alternatively, it is positioned in an axially neutral position and does not engage with each of the gear 72 and 74, and each of the second driven gear 72 and the fourth driven gear 74 is separated from the second shaft 34.

A synchromesh mechanism 84 is mounted between the sixth driven gear 76 and the seventh driven gear 77 so as to be coaxial with the second shaft 34. The synchromesh mechanism 84 integrally rotating with the second shaft 34 axially moves back and forth and selectively engages with the sixth driven gear 76 or the seventh driven gear 77, to allow the gear 76 or 77 to rotate together with the second shaft 34. Alternatively, it is positioned in an axially neutral position and does not engage with each of the gear 76 and 77, and each of the sixth driven gear 76 and the seventh driven gear 77 is separated from the second shaft 34.

According to the second working example, since the first speed reducing part G1 to the sixth speed reducing part G6 each having the different speed reduction ratio are provided, a motor 11 can be driven at highly-efficient rotation speed in response to six sections ranging from the low rotation speed to the high rotation speed. Alternatively, other than the first and second working examples, the number of the speed reducing parts can be optionally set. For example, when the three speed reducing parts each having the different speed reduction ratio are provided, the motor 11 can be driven at highly-efficient rotation speed in response to low rotation speed, middle rotation speed, and high rotation speed.

Figure 3:
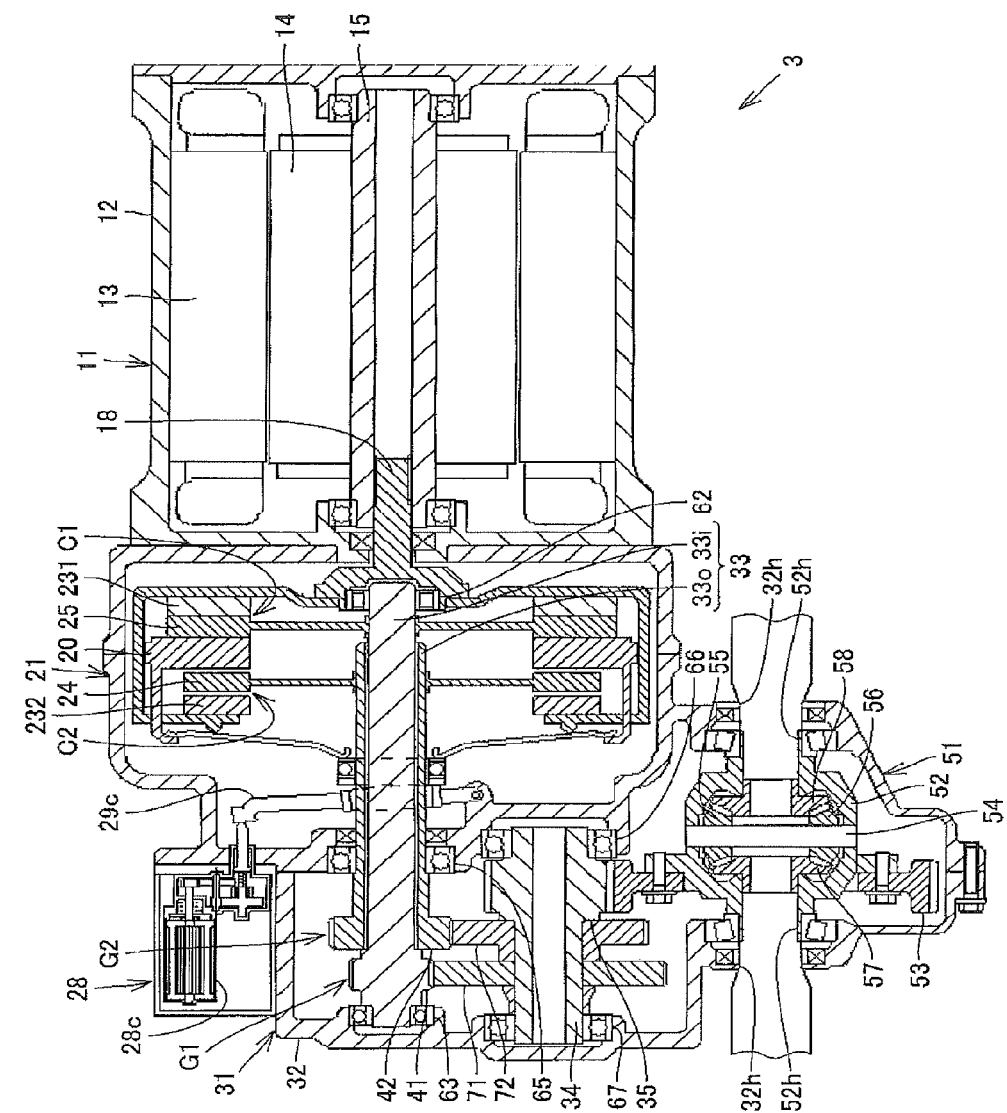
FIG. 3 is a main part development cross-sectional view showing an electric motor drive device according to a third working example.

FIG. 3 is a main part development cross-sectional view showing an electric motor drive device according to a third working example of the present invention. Since a basic configuration of the third working example is in common with the above first working example, the same member is marked with the common reference, its description is omitted, and a different configuration will be described.

The electric motor drive device 3 according to the third working example differs from the electric motor drive device 1 in that just one pressure disk is provided in a connection/disconnection part 21.

The other end of a motor side rotation member 18 projects from a motor casing 12, and is connected to a first plate 231 and a second plate 232 of the connection/disconnection part 21. The plates 231 and 232 integrally rotate with the motor side rotation member 18. Each of the plates 231 and 232 is arranged coaxially with the motor side rotation member 18, formed into a disk shape provided with a friction material on one surface, and having a center hole.

A first clutch disk 25 is arranged coaxially with the first plate 231 so as to be opposed to one surface side thereof. A friction material is provided on the surface of the first clutch disk 25 on the side opposed to the one surface of the first plate 231. A pressure disk 20 is coaxially arranged on the side opposite to the first plate 231 across the first clutch disk 25. A second clutch disk 24 is coaxially arranged on the side opposite to the first clutch disk 25 across the pressure disk 20. The second plate 232 is arranged on the side opposite to the pressure disk 20 across the second clutch disk 24. A friction material is provided on the surface of the second clutch disk 24 on the side opposite to one surface of the second plate 232.

The first plate 231, the first clutch disk 25, and the pressure disk 20 function as a first clutch C1. The first plate 231 corresponds to a first motor side friction element. The first clutch disk 25 corresponds to a first shaft side friction element. The surface of the pressure disk 20 opposed to the first clutch disk 25 corresponds to a first pressure member.

The second plate 232, the second clutch disk 24, and the pressure disk 20 function as a second clutch C2. The second plate 232 corresponds to a second motor side friction element. The second clutch disk 24 corresponds to a second shaft side friction element. The surface of the pressure disk 20 opposed to the second clutch disk 24 corresponds to a second pressure member.

An actuator unit 28 is mounted on a casing 32 so as to be adjacent to the connection/disconnection part 21 and a speed reducing part 31. The actuator unit 28 has one actuator 28c. The actuator 28c is connected to the pressure disk 20 through a link member 29c.

An operation of the above electric motor drive device 3 will be descried. When the rotation speed of a differential gear device 51 is in a low-speed rotation region below a predetermined rotation speed, only the first clutch C1 transmits rotation torque. That is, the actuator 28c moves the pressure disk 20 in one axial direction, and the one surface of the pressure disk 20 presses the first clutch disk 25 against the first plate 231. Thus, the first clutch disk 25 and the first plate 25 rotate together. Thus, an inner side rotation shaft 33i integrally rotates with the first clutch disk 25, and a first drive gear 41 rotates. The rotation speed of a first shaft 33 is reduced by a first driven gear 71 and transmitted to a second shaft 34. The rotation torque of the second shaft 34 is inputted from a pinion 35 to a ring gear 53, and transmitted to the differential gear device 51. At this time, an outer side rotation shaft 33o is rotated by a second driven gear 72, but the pressure disk 20 is positioned apart from the second clutch disk 24, so that it does not press the second clutch disk 24. While the second clutch disk 24 rotates together with the outer side rotation shaft 33o, it is apart from the second plate 232 and idles. That is, the second clutch C2 does not transmit the rotation torque.

Meanwhile, when the rotation speed of the differential gear device 51 is in a high-speed rotation region above the predetermined rotation speed, only the second clutch C2 transmits the rotation torque. That is, the actuator 28c moves the pressure disk 20 in the other axial direction, and the other surface of the pressure disk 20 presses the second clutch disk 24 against the second plate 232. Thus, the second clutch disk 24 and the second plate 232 rotate together. Thus, the outer side rotation shaft 33o integrally rotates with the second clutch disk 24 and a second drive gear 42 rotates. The rotation speed of the first shaft 33 is reduced by the second driven gear 72 and transmitted to the second shaft 34. The rotation torque of the second shaft 34 is inputted from the pinion 35 to the ring gear 53, and transmitted to the differential gear device 51. At this time, the inner side rotation shaft 33i is rotated by the first driven gear 71, but the pressure disk 20 is positioned apart from the first clutch disk 25, so that it does not press the first clutch disk 25. While the first clutch disk 25 rotates together with the inner side rotation shaft 33i, it is apart from the first plate 231 and idles. That is, the first clutch C1 does not transmit the rotation torque.

According to the third working example, since the first clutch disk 25 is arranged on the one surface side of the pressure disk 20, and the second clutch disk 24 is arranged on the other surface side of the pressure disk 20, a first speed reducing part G1 and a second speed reducing part G2 can be switched by moving the common pressure disk 20 by the one actuator 28c. Therefore, the electric motor drive device can be further miniaturized. In addition, since the pressure disk 20 selectively presses the first clutch disk 25 or the second clutch disk 24, the only one link member 29c is required unlike the first working example and the second working example, so that the third working example has an advantage in reduction in the number of components and cost.

According to the first to third working examples, since the first shaft 33 has the double shaft structure composed of the outer side rotation shaft 33o and the inner side rotation shaft 33i, the two clutches C1 and C2 can be arranged on the first shaft 33, so that the working examples are advantageous to the space limitations of the vehicle.

In addition, the arrangement layouts of the electric motor drive devices 1 to 3 are provided such that the motor 11, the connection/disconnection part 21, and the speed reducing part 31 are arranged in this order in the axial direction of the first shaft 33, which can be the same as the alignment order of the conventional engine, torque converter, automatic transmission. Therefore, the electric motor drive device can be easily mounted on the existing vehicle space.

In addition, since the speed reducing part 31 of the electric motor drive device 2 additionally has the third speed reducing part G3 to reduce the speed of the rotation of the first shaft 33 with the speed reduction ratio different from the first speed reduction ratio and the second speed reduction ratio, the motor 11 can be operated at the highly-efficient rotation speed in response to low-speed running, middle-speed running, and high-speed running, which further improves energy efficiency.

In addition, since each of the first clutch C1 and the second clutch C2 is the friction clutch having the friction material, a power transmission passage from the motor 11 to the wheel through the inner side rotation shaft 33i or the outer side rotation shaft 33o can be smoothly switched by switching the first clutch C1 and the second clutch C2.

In addition, regarding the speed reducing part 31 provided astride the first shaft 33 and the second shaft 34, the outer diameter dimension thereof on the side of the first shaft 33 is smaller than the outer diameter dimension of the connection/disconnection part 21 provided coaxially with the first shaft 33. Thus, the actuators 28a, 28b, and 28c are arranged on the outer diameter side of the speed reducing part 31 provided around the first shaft 33. Consequently, the actuators can be arranged in the radial stepped region formed between the connection/disconnection part having the large radial dimension around the first shaft, and the speed reducing part having the relatively small diameter around the first shaft, so that the arrangement layout of the actuators can be optimal in the electric motor drive device.

In addition, since the connection/disconnection part 21 of the electric motor drive device 3 has the common pressure disk 20, the first speed reducing part G1 and the second speed reducing part G2 can be switched by moving the common pressure disk 20 by the one actuator 28c. Therefore, the electric motor drive device can be further miniaturized and is advantageous to the space limitations of the vehicle.

Furthermore, the actuator 28c of the electric motor drive device 3 is arranged on the outer diameter side of the speed reducing part provided around the first shaft, and adjacently arranged in roughly the same position as the speed reducing part in the axial direction. According to this embodiment, the arrangement layout of the actuator can be neat, so that the electric motor drive device can be further miniaturized. Therefore, the electric motor drive device can be more easily mounted on the vehicle.

Figure 4:
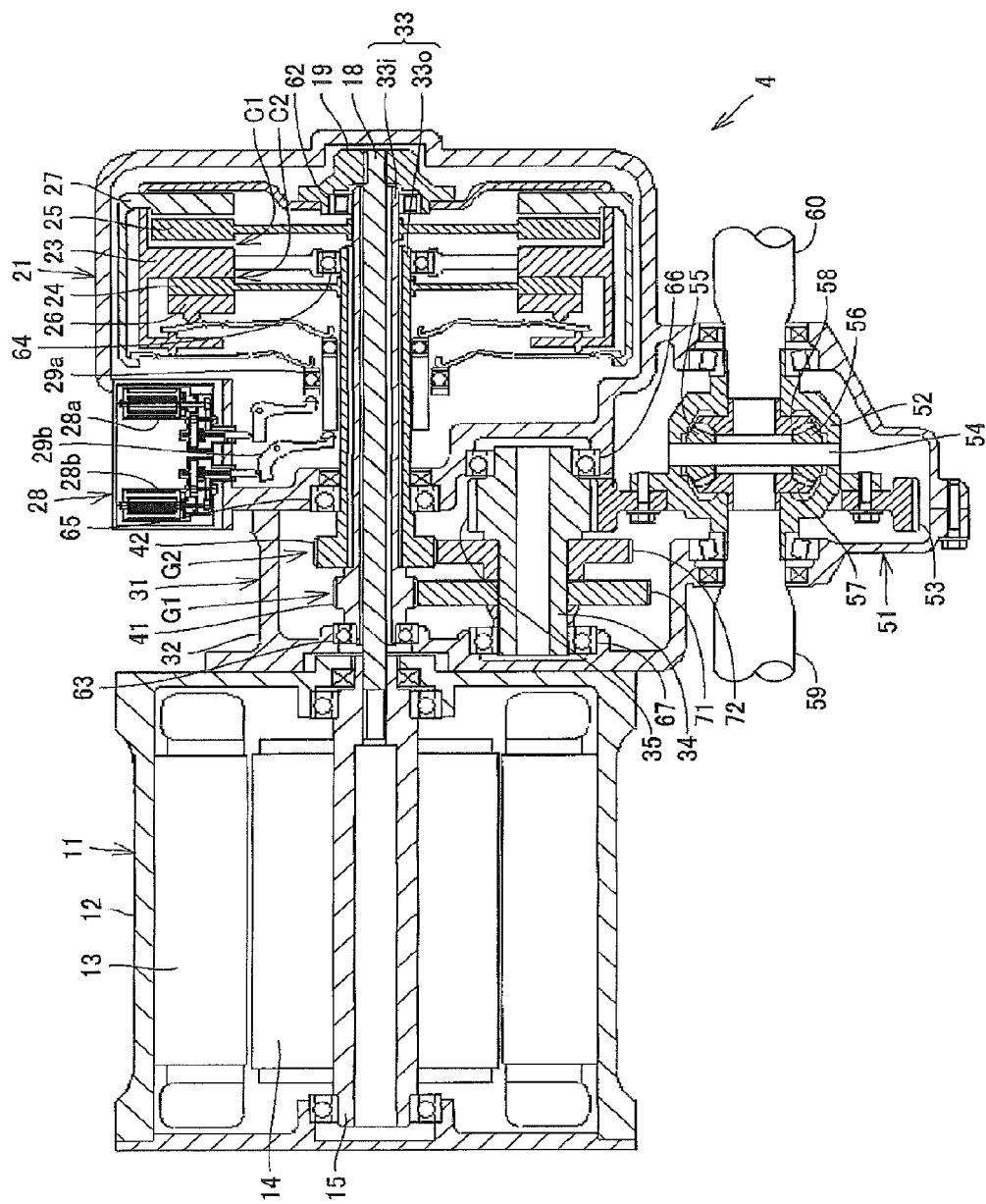
FIG. 4 is a main part development cross-sectional view showing an electric motor drive device according to a fourth working example.

FIG. 4 is main part development cross-sectional view showing an electric motor drive device according to a fourth working example. The electric motor drive device 4 of the fourth working example includes a motor 11, a connection/disconnection part 21, and a speed reducing part 31. The motor 11 is a radial gap motor including a stator 13 fixed to a motor casing 12, a rotor 14 arranged in a position so as to be opposed to the inner side of the stator 13 with a radially open gap interposed therebetween, a motor output shaft 15 fixedly connected to the inner side of the rotor 14 and integrally rotating with the rotor 14.

The motor casing 12 is connected to a casing 32 at an axial one end of the motor 11. The motor output shaft 15 is rotatably supported by the motor casing 12 at each end, and one end of the motor output shaft 15 is connected to the other end of a motor side rotation member 18. The motor side rotation member 18 projects from the motor 11 toward the axial one side. The speed reducing part 31 is arranged in a root part of the motor side rotation member 18 on the side close to the motor 11. The connection/disconnection part 21 is arranged in a tip end part of the motor side rotation member 18 on the side distant from the motor 11. The tip end of the motor side rotation member 18 is connected to a center plate 23 in the connection/disconnection part 21 through a link member 19. The center plate 23 is provided coaxially with the motor side rotation member 18, and integrally rotates with the motor side rotation member 18. The center plate 23 is formed into a disk shape having a friction material on each surface, and has a center hole.

The speed reducing part 31 is housed in the casing 32, and has a first speed reducing part G1 and a second speed reducing part G2 arranged in the casing 32. The first speed reducing part G1 reduces rotation speed of the motor output shaft 15 with a predetermined first speed reduction ratio and transmits it to a wheel (not shown). The second speed reducing part G2 reduces the rotation speed of the motor output shaft 15 with a second speed reduction ratio smaller than the first speed reduction ratio and transmits it to the wheel.

Thus, the speed reducing part 31 has a tube shaped first shaft 33 into which the motor side rotation member 18 is inserted, and a second shaft 34 extending parallel to the first shaft 33. The first shaft 33 is a double shaft composed of a tube-shaped inner side rotation shaft 33i into which the motor side rotation member 18 is inserted, and a tube-shaped outer side rotation shaft 33o into which the inner side rotation shaft 33i is inserted. Each end of the inner side rotation shaft 33i projects from each end of the outer side rotation shaft 33o, and one end of the inner side rotation shaft 33i positioned on the side distant from the motor 11 is rotatably supported by the link member 19 via a rolling bearing 62. In addition, the other end of the inner side rotation shaft 33i positioned on the side of the motor 11 is rotatably supported by the casing 32 via a rolling bearing 63.

One end of the outer side rotation shaft 33o positioned on the side distant from the motor 11 is rotatably supported by a center hole of the center plate 23 via a rolling bearing 64. In addition, the other end of the outer side rotation shaft 33o positioned on the side of the motor 11 is rotatably supported by the casing 32 via a rolling bearing 65.

A first drive gear 41 is formed at the other end of the inner side rotation shaft 33i on the side of the motor 11. A second drive gear 42 is formed at the other end of the outer side rotation shaft 33o on the side of the motor 11. A second driven gear 72 is fixed to the second shaft 34 on the side close to the motor 11, and a first driven gear 71 is fixed thereto on the side closer to the motor 11. Among radiuses of the gears 41, 42, 71, and 72, the radius of the first drive gear 41 is smallest, and the radiuses of the second drive gear 42, the second driven gear 72, and the first driven gear 71 increase in this order. The first drive gear 41 always meshes with the first driven gear 71, and the gears 41 and 71 function as the first speed reducing part G1. The second drive gear 42 always meshes with the second driven gear 72, and the gears 42 and 72 function as the second speed reducing part G2.

While the first shaft 33 extends from the speed reducing part 31 to the connection/disconnection part 21, the second shaft 34 is positioned between the motor 11 and the connection/disconnection part 21, and extends only inside the speed reducing part 31. One end of the second shaft 34 positioned on the side distant from the motor 11 is rotatably supported by the casing 32 via a rolling bearing 66 in the vicinity of the connection/disconnection part 21. A pinion 35 having a diameter smaller than that of the second driven gear 72 is formed in the second shaft 34 on the side close to the connection/disconnection part 21. The pinion 35 always meshes with a ring gear 53 mounted on a differential gear case 52. The other end of the second shaft 34 provided on the side of the motor 11 is rotatably supported by the casing 32 via a rolling bearing 67 in the vicinity of the motor 11. The rolling bearing 67 is positioned in axially the same position as the rolling bearing 63.

A distance between the first shaft 33 and the second shaft 34 is roughly equal to a radius dimension of the connection/ disconnection part 21 as will be described below. Thus, a layout of the speed reducing part 31 can be optimal in the electric motor drive device 4, so that the electric motor drive device 1 can be easily mounted on the vehicle.

The connection/disconnection part 21 is housed in the casing 32, and has a first clutch C1 and a second clutch C2 arranged inside the casing 32. A first clutch disk 25 having a friction material and a first pressure disk 27 are sequentially arranged on one surface side of the center plate 23. The first clutch disk 25 is mounted on an end part of the inner side rotation shaft 33$i$ on the side distant from the motor 11 and integrally rotates with the inner side rotation shaft 33$i$. The center plate 23, the first clutch disk 25, and the first pressure disk 27 function as the first clutch C1.

A second clutch disk 24 having a friction material, and a second pressure disk 26 are sequentially arranged on the other surface side of the center plate 23. The second clutch disk 24 is mounted on an end part of the outer side rotation shaft 33$o$ on the side distant from the motor 11 and integrally rotates with the outer side rotation shaft 33$o$. The center plate 23, the second clutch disk 24, and the second pressure disk 26 function as the second clutch C2. The connection/disconnection part 21 disconnects or connects the first clutch C1 and the second clutch C2 as will be described below to disconnect or connect the rotation transmission of the speed reducing part 31.

That is, the connection/disconnection part 21 has the first clutch C1 to connect the motor side rotation member 18 to the inner side rotation shaft 33$i$, and the second clutch C2 to connect the motor side rotation member 18 to the outer side rotation shaft 33$c$. Thus, the two clutches C1 and C2 are arranged on the first shaft 33.

In addition, a radial dimension of the connection/disconnection part 21 is roughly equal to that of the motor 11. Thus, a layout of the connection/disconnection part 21 can be optimal in the electric motor drive device 1, so that the electric motor drive device 4 can be easily mounted on the vehicle.

A differential gear device 51 is provided in the casing 32. Hereinafter, the differential gear device 51 will be described. A pinion mate shaft 54 is inserted into the gear case 52 so as to be parallel to a rolling surface of the ring gear 53, and a pair of pinion mate gears 55 and 56 rotatably supported on the shaft 54 is arranged in the differential gear case 52. A pair of side gears 57 and 58 which is positioned between the pinion mate gears 55 and 56 and meshes with them is rotatably arranged in the differential gear case 52. A center hole of the one side gear 57 is serration-fit to one end of one drive shaft 59. A center hole of the other side gear 58 is serration-fit to one end of another drive shaft 60. The other end of the one drive shaft 59 is connected to a left wheel (not shown) to drive it, and the other end of the other drive shaft 60 is connected to a right wheel (not shown) to drive it.

An actuator unit 28 is mounted on the casing 32 so as to be adjacent to the connection/disconnection part 21. The actuator unit 28 is positioned in axially the same position as the speed reducing part 31 and has two actuators 28$a$ and 28$b$. One actuator 28$a$ is connected to the first pressure disk 27 through a link member 29$a$. The other actuator 28$b$ is connected to the second pressure disk 26 through a link member 29$b$.

The actuator unit 28 is arranged in a radially stepped region formed between the connection/disconnection part 21 having a large radial dimension around the first shaft 33, and the speed reducing part 31 having a relatively small diameter and housing the gears 41 and 42 provided around the first shaft 33. Thus, a layout of the actuator unit 28 can be optimal in the electric motor drive device 4, so that the electric motor drive device 4 can be easily mounted on the vehicle.

Hereinafter, an operation of the above electric motor drive device 4 will be described. When the motor 11 is turned on and the motor side rotation member 18 is driven and rotates, the center plate 23 integrally rotates with the motor side rotation member 18 and the link member 19. When the rotation speed of the differential gear device 51 is in a predetermined low-speed rotation region, the actuator unit 28 connects the first clutch C1 and disconnects the second clutch C2, and the rotary drive of the motor 11 is reduced by the first speed reducing part G1 and transmitted to the differential gear device 51. Thus, even when the rotation speed of the differential gear device 51 is in the low-speed region, the rotation speed of the motor 11 can be provided in a highly-efficient region.

Meanwhile, when the rotation speed of the differential gear device 51 is in a predetermined high-speed rotation region, the actuator unit 28 disconnects the first clutch C1 and connects the second clutch C2, and the rotation drive of the motor 11 is reduced by the second speed reducing part G2 and transmitted to the differential gear device 51. Thus, when the rotation speed of the differential gear device 51 is in the high-speed region, the rotation speed of the motor 11 can be provided in a highly-efficient region.

More specifically, when the rotation speed of the differential gear device 51 is in the low-speed rotation region below a predetermined rotation speed, the actuator 28$a$ moves the first pressure disk 27 in an axial direction, and the first pressure disk 27 presses the first clutch disk 25 against the center plate 23. Thus, the first clutch disk 25 and the center plate 23 rotate together and the first clutch C1 transmits rotation torque. Then, the inner side rotation shaft 33$i$ integrally rotates with the first clutch disk 25 and the first drive gear 41 rotates. The rotation speed of the first shaft 33 is reduced by the first driven gear 71 and transmitted to the second shaft 34. The rotation torque of the second shaft 34 is inputted from the pinion 35 to the ring gear 53, and transmitted to the differential gear device 51. At this time, the outer side rotation shaft 33$o$ is rotated by the second driven gear 72, but the second pressure disk 26 is positioned apart from the center plate 23, so that it does not press the second clutch disk 24. While the second clutch disk 24 rotates together with the outer side rotation shaft 33$o$, it is apart from the center plate 23 and idles. That is, the second clutch C2 does not transmit the rotation torque.

Meanwhile, when the rotation speed of the differential gear device 51 is in the high-speed rotation region above the predetermined rotation speed, the actuator 28$b$ moves the second pressure disk 26 in the axial direction, and the second pressure disk 26 presses the second clutch disk 24 against the center plate 23. Thus, the second clutch disk 24 and the center plate 23 rotate together and the second clutch C2 transmits the rotation torque. Then, the outer side rotation shaft 33$o$ integrally rotates with the second clutch disk 24 and the second drive gear 42 rotates. The rotation speed of the first shaft 33 is reduced by the second driven gear 72 and transmitted to the second shaft 34. The rotation torque of the second shaft 34 is inputted from the pinion 35 to the ring gear 53, and transmitted to the differential gear device 51. At this time, the inner side rotation shaft 33$i$ is rotated by the first driven gear 71, but the first pressure disk 27 is positioned apart from the center plate 23, so that it does not press the first clutch disk 25. While the first clutch disk 25 rotates together with the inner side rotation shaft 33$i$, it is apart from the center plate 23 and idles. That is, the first clutch C1 does not transmit the rotation torque.

Since each of the two clutches C1 and. C2 is the friction clutch having the friction material, the low-speed region and the high-speed region can be smoothly switched by switching the clutches C1 and C2. Therefore, the present invention can eliminate the shock which is generated due to the switching between the first and second clutches in the case where the two-way clutch is used in the electric motor drive device according to the patent document 1.

In addition, although not shown in the drawing, the speed reducing part 31 may further has a third speed reducing part to reduce the rotation speed of the first shaft 33 with a third speed reduction ratio different from the first speed reduction ratio and the second speed reduction ratio and transmit it to the second shaft 34. The speed reducing part 31 may have a fourth speed reducing part, a fifth speed reducing part, and the like, other than the first speed reducing part G1, the second speed reducing part G2, and the third speed reducing part.

The third speed reducing part is composed of a third drive gear formed at one end part of the inner side rotation shaft 33$i$, and a third driven gear coaxially mounted on the second shaft 34 and meshes with the third drive gear. The first driven gear 71 and the third driven gear are mounted on the second shaft in a relatively rotatable manner. A synchromesh mechanism is mounted between the first driven gear 71 and the third driven gear so as to be coaxial with the second shaft 34 and axially moves back and force to selectively engage with the first driven gear 71 or the third driven gear 73 to allow the gear 71 or 73 to integrally rotate with the second shaft 34. Alternatively, it is positioned in an axially neutral position and does not engage with each of the gears 71 and 73, and each of the first driven gear 71 and the third driven gear 73 is separated from the second shaft 34.

Since the speed reducing part G1, the second speed reducing part G2, and the third speed reducing part each having the different speed reduction ratio are provided, the motor 11 can be operated at the highly-efficient rotation speed in response to rotation speed sections such as low rotation speed, middle rotation speed, and high rotation speed.

Alternatively, when more speed reducing parts are provided, the motor 11 can be more efficiently driven, in response to more rotation speed sections.

Figure 5:
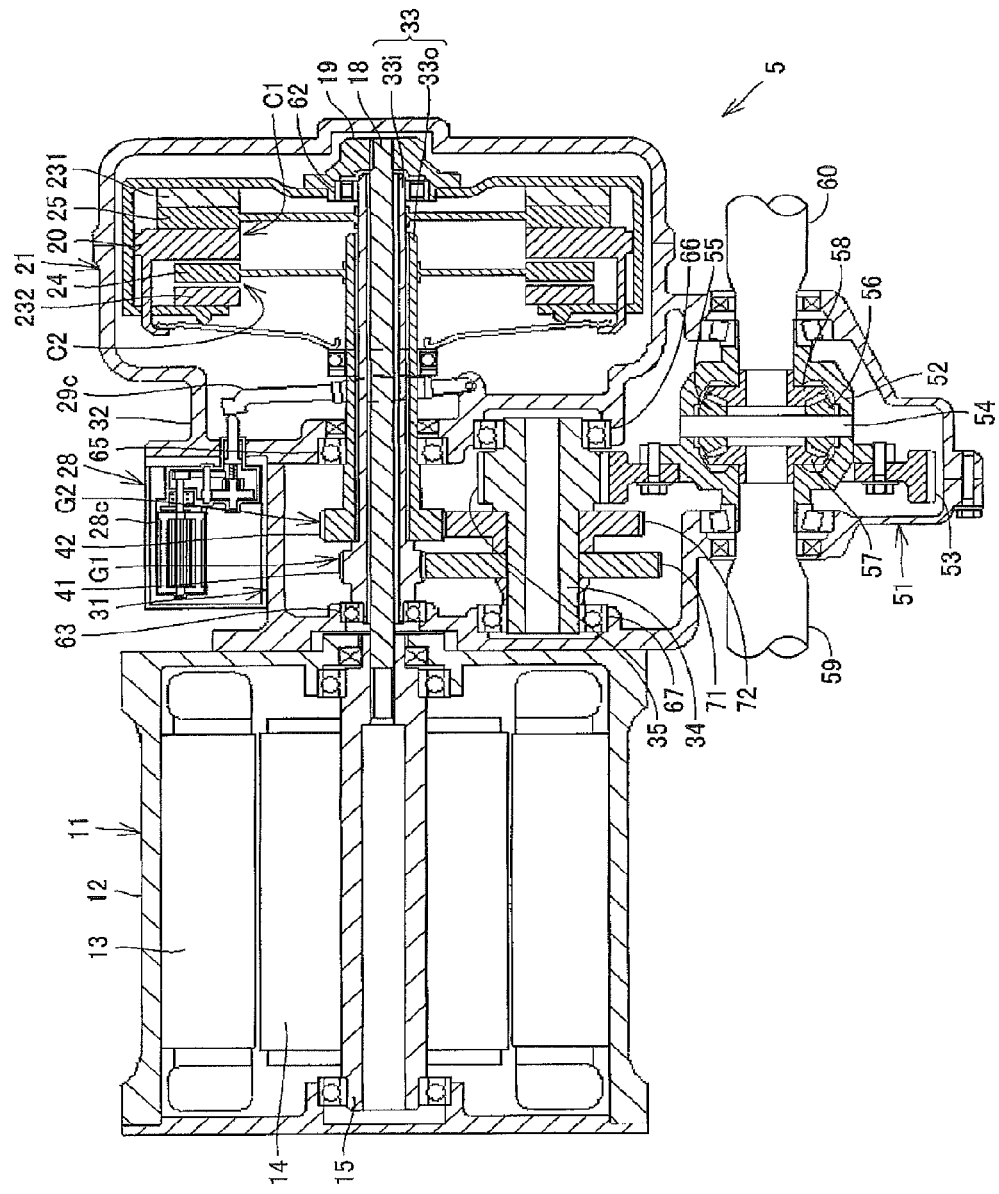
FIG. 5 is a main part development cross-sectional view showing an electric motor drive device according to a fifth working example.

FIG. 5 is a main part development cross-sectional view showing an electric motor drive device according to a fifth working example of the present invention. Since a basic configuration of the fifth working example is in common with the above third working example and the fourth working example, the same member is marked with the common reference, its description is omitted, and a different configuration will be described.

The electric motor drive device 5 according to the fifth working example differs from the electric motor drive device 4 in that just one pressure disk is provided in a connection/disconnection part 21.

A tip end of a motor side rotation member 18 is connected to a first plate 231 and a second plate 232 of the connection/disconnection part 21 through a link member 19. Each of the plates 231 and 232 is provided coaxially with the motor side rotation member 18 and integrally rotates with the motor side rotation member 18. Each of the plates 231 and 232 is arranged coaxially with the motor side rotation member 18, formed into a disk shape having a friction member on one surface, and has a center hole. A first shaft 33 is inserted into the center hole.

A first clutch disk 25 is arranged coaxially with the first plate 231 so as to be opposed to one surface side thereof. A friction material is provided on the surface of the first clutch disk 25 on the side opposed to the one surface of the first plate 231. A pressure disk 20 is coaxially arranged on the side opposite to the first plate 231 across the first clutch disk 25. A second clutch disk 24 is coaxially arranged on the side opposite to the first clutch disk 25 across the pressure disk 20. The second plate 232 is arranged on the side opposite to the pressure disk 20 across the second clutch disk 24. A friction material is provided on the surface of the second clutch disk 24 on the side opposed to one surface of the second plate 232.

An actuator unit 28 is mounted on a casing 32, in axially the same position as a speed reducing part 31. The actuator unit 28 is adjacent to the connection/disconnection part 21, and has one actuator 28$c$. The actuator 28$c$ is connected to the pressure disk 20 through a link member 29$c$.

An operation of the above electric motor drive device 5 will be descried. When the rotation speed of a differential gear device 51 is in a low-speed rotation region below a predetermined rotation speed, only the first clutch C1 transmits rotation torque. That is, the actuator 28$c$ moves the pressure disk 20 in one axial direction, and the one surface of the pressure disk 20 on the side of the first clutch disk 25 presses the first clutch disk 25 against the first plate 231. Thus, the first clutch disk 25 and the first plate 231 rotate together. Thus, an inner side rotation shaft 33$i$ integrally rotates with the first clutch disk 25, and a first drive gear 41 rotates. The rotation speed of the first shaft 33 is reduced by a first driven gear 71 and transmitted to a second shaft 34. The rotation torque of the second shaft 34 is inputted from a pinion 35 to a ring gear 53, and transmitted to the differential gear device 51. At this time, an outer side rotation shaft 33$o$ is rotated by a second driven gear 72, but the pressure disk 20 is positioned apart from the second clutch disk 24, so that it does not press the second clutch disk 24. While the second clutch disk 24 rotates together with the outer side rotation shaft 33$o$, it is apart from the second plate 232 and idles. That is, the second clutch C2 does not transmit the rotation torque.

Meanwhile, when the rotation speed of the differential gear device 51 is in a high-speed rotation region above the predetermined rotation speed, only the second clutch C2 transmits the rotation torque. That is, the actuator 28$c$ moves the pressure disk 20 in the other axial direction, and the surface of the pressure disk 20 on the side of the second clutch disk 24 presses the second clutch disk 24 against the second plate 232. Thus, the second clutch disk 24 and the second plate 232 rotate together. Thus, the outer side rotation shaft 33$o$ integrally rotates with the second clutch disk 24 and a second drive gear 42 rotates. The rotation speed of the first shaft 33 is reduced by the second driven gear 72 and transmitted to the second shaft 34. The rotation torque of the second shaft 34 is inputted from the pinion 35 to the ring gear 53, and transmitted to the differential gear device 51. At this time, the inner side rotation shaft 33$i$ is rotated by the first driven gear 71, but the pressure disk 20 is positioned apart from the first clutch disk 25, so that it does not press the first clutch disk 25. While the first clutch disk 25 rotates together with the inner side rotation shaft 33$i$, it is apart from the first plate 231 and idles. That is, the first clutch C1 does not transmit the rotation torque.

According to the fifth working example, since the first clutch disk 25 is arranged on the one surface side of the pressure disk 20, and the second clutch disk 24 is arranged on the other surface side of the pressure disk 20, a first speed reducing part G1 and a second speed reducing part G2 can be switched by moving the common pressure disk 20 by the one actuator 28$c$. Therefore, the electric motor drive device can be further miniaturized. In addition, since the pressure disk 20 selectively presses the first clutch disk 25 or the second clutch disk 24, only one link member 29$c$ is required unlike the fourth working example, so that the fifth working example has an advantage in reduction in the number of components and cost.

According to the fourth working example and the fifth working example, since the first shaft 33 has the double shaft structure composed of the outer side rotation shaft 33o and the inner side rotation shaft 33i, the two clutches C1 and C2 can be arranged on the first shaft 33, so that the working examples are advantageous to the space limitations of the vehicle.

In addition, the inner side rotation shaft 33i has the tube shape, the motor side rotation member 18 projecting from the motor 11 to the axial one side is inserted into the inner side rotation shaft 33i, the first clutch C1 is provided in the end part of the inner side rotation shaft 33i on the side distant from the motor 11, and the second clutch C2 is provided in the end part of the outer side rotation shaft 33o on the side distant from the motor 11. Thus, the speed reducing part 31 and the connection/disconnection part 21 are sequentially arranged on the axial one end side of the motor 11, and the speed reducing part 31 can be arranged in the center of the electric motor drive device 4 or 5. Therefore, the differential gear device 51 to distribute the output of the speed reducing part to the left and right wheels can be arranged in the center of the vehicle in its width direction, which improves weight balance of the vehicle.

In addition, since each of the first clutch C1 and the second clutch C2 is the friction clutch having the friction material, a power transmission passage from the motor 11 to the wheel through the inner side rotation shaft 33i or the outer side rotation shaft 33o can be smoothly switched by switching the first clutch C1 and the second clutch C2.

In addition, a first pressure member and a second pressure member of the electric motor drive device 5 corresponds to the one surface and the other surface of the common pressure disk 20, respectively, the first plate 231 corresponding to a first motor side friction element and the first clutch disk 25 corresponding to a first shaft side friction element are arranged on the one surface side of the pressure disk 20, the second plate 232 corresponding to a second motor side friction element and the second clutch disk 24 corresponding to a second shaft side friction element are arranged on the other surface side of the pressure disk 20, and the connection/disconnection part 21 further has the actuator 28c to move the pressure disk 20 toward the one surface side and the other surface side. According to this embodiment, the first clutch C1 is arranged on the one surface side of the pressure disk 20, and the second clutch C2 is arranged on the other surface side of the pressure disk 20, so that the first and second speed reducing parts G1 and G2 can be switched by moving the common pressure disk 20 by the one actuator 28c. Therefore, the electric motor drive device can be further miniaturized, and more advantageous to the space limitations of the vehicle.

Figure 6:
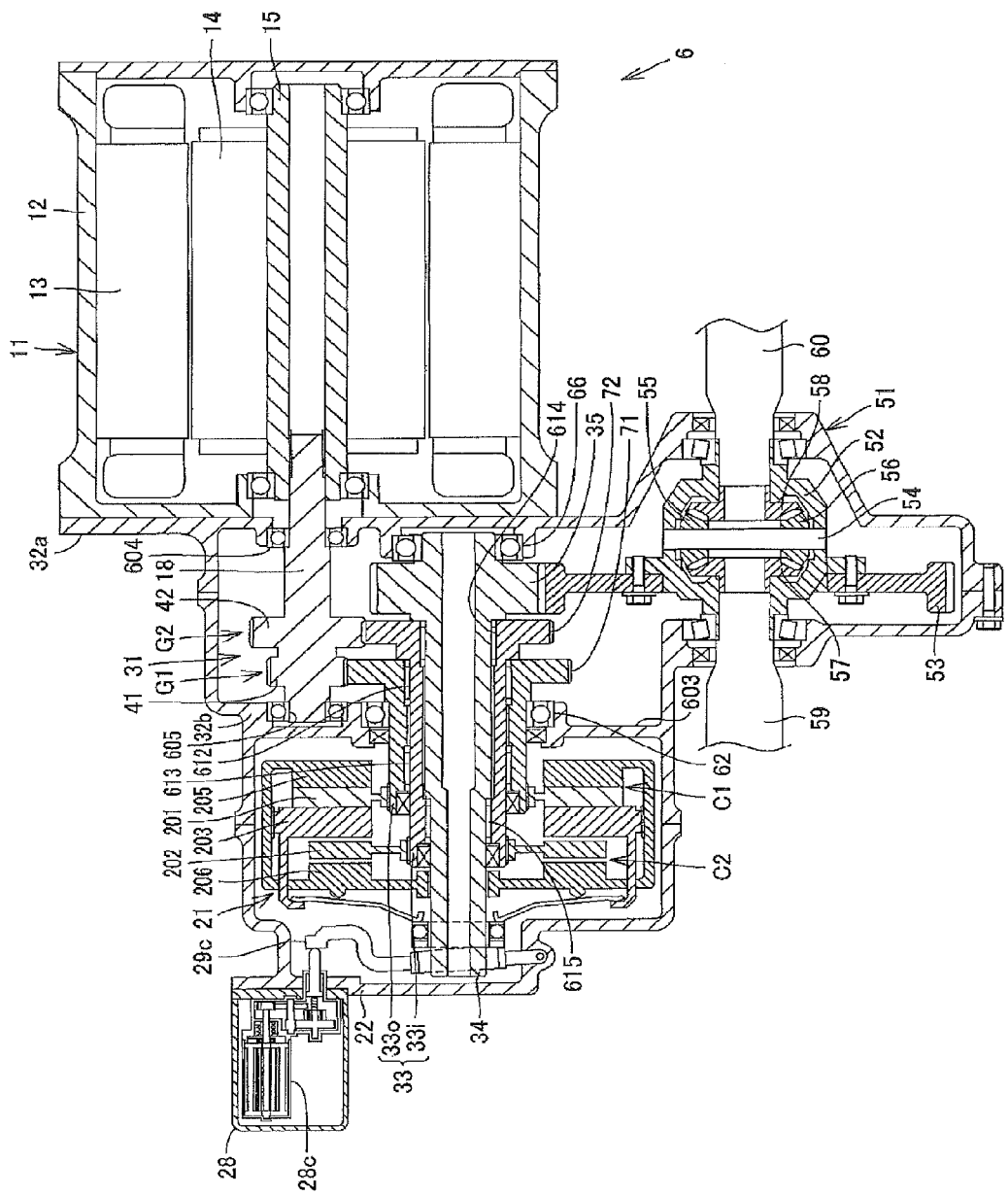
FIG. 6 is a main part development cross-sectional view showing an electric motor drive device according to a sixth working example.

FIG. 6 is a main part development cross-sectional view showing an electric motor drive device according to a sixth working example of the present invention. The electric motor drive device 6 according to the sixth working example includes a motor 11, a speed reducing part 31, and a connection/disconnection part 21. The electric motor drive device 6 is mounted on a vehicle as a power source of an electric car. Alternatively, in a vehicle provided such that one of front and rear wheels is driven by an internal-combustion engine, it is mounted thereon as a sub-power source to drive the other of the front and rear wheels.

The motor 11 is a radial gap motor including a stator 13 fixed to a motor casing 12, a rotor 14 arranged in a position opposed to the inner side of the stator 13 with a radially open gap interposed therebetween, a motor output shaft 15 fixedly connected to the inner side of the rotor 14 and integrally rotating with the rotor 14.

The motor casing 12 is connected to a speed reducing part casing 32a on one axial end side of the motor 11. The speed reducing part casing 32a has an opening region on the side axially opposite to the motor 11, and a partition casing 32b is placed on the opening region side. The partition casing 32b has a partition wall 603 to set a boundary between the speed reducing part 31 and the connection/disconnection part 21, and forms an opening region on each of the side distant from the motor 11 and the side close to the motor 11 across the partition wall 603. The opening region of the partition casing 32b on the side close to the motor 11 is connected to the opening region of the speed reducing part casing 32a, whereby the speed reducing part casing 32a and the partition casing 32b provide a closed space to house the speed reducing part 31 and a differential gear device 51.

The motor output shaft 15 is rotatably supported at each end by the motor casing 12, and one end of the motor output shaft 15 is connected to the other end of a motor side rotation member 18. The other end of the motor side rotation member 18 on the side close to the motor 11 is supported by the speed reducing part casing 32a via a bearing 604. One end of the motor side rotation member 18 on the side distant from the motor 11 is supported by the speed reducing part casing 32a via a bearing 605. A first drive gear 41 is formed in one end part of the motor side rotation member 18. A second drive gear 42 is formed in a middle part of the motor side rotation member 18.

The speed reducing part 31 includes the speed reducing part casing 32a, the partition casing 32b on the side of the speed reducing part, the motor side rotation member 18, a double shaft 33, a first speed reducing part G1 and a second speed reducing part G2 arranged inside the speed reducing part casing 32a and the partition casing 32b, and an output shaft 34. The speed reducing part casing 32a is connected to the motor casing 12 at the other axial end. The partition casing 32b is connected to a connection/disconnection part casing 22 at one axial end. Thus, the motor 11, the speed reducing part 31, and the connection/disconnection part 21 are axially arranged in this order in the electric motor drive device 6.

One end part of the motor side rotation member 18 transmits the rotation to the double shaft 33 through the first speed reducing part G1 and the second speed reducing part G2. Therefore, the one end part of the motor side rotation member 18 corresponds to an opposite-side shaft which forms a pair with the double shaft 33. The other end part of the motor side rotation member 18 is connected to the motor output shaft 15, so that it corresponds to an input shaft of the speed reducing part 31. The first speed reducing part G1 reduces rotation speed of the motor side rotation member 18 with a first speed reduction ratio and transmits it to a wheel (not shown). The second speed reducing part G2 reduces the rotation speed of the motor side rotation member 18 with a second speed reduction ratio smaller than the first speed reduction ratio and transmits it to the wheel.

Thus, the speed reducing part 31 has the double shaft 33 extending parallel to the motor side rotation member 18. The double shaft 33 has a tube-shaped outer side rotation shaft 33o, and an inner side rotation shaft 33i inserted into the outer side rotation shaft 33o. Each end of the inner side rotation shaft 33i projects from the outer side rotation shaft 33o, and a second driven gear 72 is formed at the other end thereof on the side close to the motor 11. The second driven gear 72 always meshes with the second driven gear 42, and the gears 42 and 72 function as the second speed reducing part G2.

A middle periphery part of the outer side rotation shaft 33o is supported by the partition wall 603 of the partition casing 32b to provide the boundary between the speed reducing part 31 and the connection/disconnection part 21, via a bearing 62. An inner peripheral surface of the outer side rotation shaft 33o supports an outer peripheral surface of the inner side rotation shaft 33i in a relatively rotatable manner, through needle roller bearings 612 and 613 arranged axially apart from each other. A first driven gear 71 is formed at the other end of the outer side rotation shaft 33o on the side close to the motor 11. The first driven gear 71 always meshes with the first drive gear 41, and the gears 41 and 71 function as the first speed reducing part G1.

The connection/disconnection part 21 includes the connection/disconnection part casing 22, and a first clutch C1 and a second clutch C2 arranged in the connection/disconnection part casing 22. These clutches C1 and C2 will be described in detail. A first clutch disk 201 is mounted on the other end of the outer side rotation shaft 33o so as to integrally rotate. A second clutch disk 202 is mounted on the other end of the inner side rotation shaft 33i so as to integrally rotate. A pressure disk 203 is arranged between the first clutch disk 201 and the second clutch disk 202. In addition, a surface of the first clutch disk 201 on the side opposite to the pressure disk 203 has a friction material. The surface of the first clutch disk 201 is opposed to a first clutch plate 205 having a friction material.

The pressure disk 203, the first clutch disk 201, and the first clutch plate 205 function as the first clutch C1. The first clutch plate 205 corresponds to a first driven side friction element. The first clutch disk 201 corresponds to a first drive side friction element. A surface of the pressure disk 203 opposed to the first clutch disk 201 corresponds to a first pressure member.

A surface of the second clutch disk 202 on the side opposite to the pressure disk 203 has a friction material. The surface of the second clutch disk 202 is opposed to a second clutch plate 206 having a friction material. The second clutch plate 206 and the first clutch plate 205 are mounted on the output shaft 34 of the speed reducing part 31 so as to integrally rotate.

The pressure disk 203, the second clutch disk 202, and the second clutch plate 206 function as the second clutch C2. The second clutch plate 206 corresponds to a second driven side friction element. The second clutch disk 202 corresponds to a second drive side friction element. A surface of the pressure disk 203 opposed to the second clutch disk 202 corresponds to a second pressure member.

The clutches C1 and C2 may be any type of a dry-type single plate, a dry-type multiple plate, a wet-type single plate, and a wet-type multiple plate.

In the connection/disconnection part 21, the first clutch plate 205 is arranged on the side closest to the motor 11, and the first clutch plate 205, the first clutch disk 201, the pressure disk 203, the second clutch disk 202, and the second clutch plate 206 are arranged so as to be away from the motor 11 in this order. Each of them has a center hole to which the double shaft 33 and the output shaft 34 penetrate. That is, the two clutches C1 and C2 are arranged on the double shaft 33.

The output shaft 34 is inserted to the tube-shape inner side rotation shaft 33i, and each end thereof projects from each end of the inner side rotation shaft 33i. Needle roller bearings 614 and 615 are interposed between an outer peripheral surface of the output shaft 34 and an inner peripheral surface of the inner side rotation shaft 33i, in axial two positions. The other end of the output shaft 34 extends to the vicinity of the motor 11 and is rotatably supported by the speed reducing part casing 32a via a ball bearing 66. A pinion 35 having a small diameter is formed in this other end part. The pinion 35 always meshes with a ring gear 53 mounted on a differential gear case 52. One end part of the output shaft 34 is connected to the first clutch plate 205 and the second clutch plate 206 as described above.

The connection/disconnection part 21 disconnects or connects the first clutch C1 and the second clutch C2 as will be described below to disconnect or connect the rotation transmission of the speed reducing part 31.

An actuator unit 28 is mounted on the connection/disconnection part 21 on the side axially distant from the speed reducing part 31. The actuator unit 28 has an actuator 28c. The actuator 28c is connected to the pressure disk 203 through a link member 29c.

The actuator unit 28 is mounted on an outer surface of the connection/disconnection part casing 22, and positioned most distant from the motor 11 in the axial direction in the electric motor drive device 6.

The speed reducing part 31 is provided with the differential gear device 51. The differential gear device 51 is positioned a part from the double shaft 33 and the output shaft 34 in a direction perpendicular to the axis direction. Hereinafter, the differential gear device 51 will be described. A pinion mate shaft 54 is inserted into the differential gear case 52 so as to be parallel to a rolling surface of the ring gear 53, and a pair of pinion mate gears 55 and 56 rotatably supported on the shaft 54 is arranged in the differential gear case 52. A pair of side gears 57 and 58 which is positioned between the pinion mate gears 55 and 56 and meshes with them is rotatably arranged in the differential gear case 52. A center hole of the one side gear 57 is serration-fit to one end of a drive shaft 59. A center hole of the other side gear 58 is serration-fit to one end of another drive shaft 60. The other end of the one drive shaft 59 is connected to a left wheel (not shown) to drive it, and the other end of the other drive shaft 60 is connected to a right wheel (not shown) to drive it.

Hereinafter, an operation of the above electric motor drive device 6 will be described. When the motor 11 is turned on and the motor output shaft 15 is driven and rotates, the motor side rotation member 18 rotates together with the motor output shaft 15.

When the rotation speed of the differential gear device 51 is in a predetermined low-speed rotation region, the actuator unit 28 connects the first clutch C1 and disconnects the second clutch C2, and the rotary drive of the motor side rotation member 18 is reduced by the first speed reducing part G1 and transmitted to the differential gear device 51. Thus, even when the rotation speed of the differential gear device 51 is in the low-speed region, the rotation speed of the motor 11 can be provided in a highly-efficient region.

More specifically, the actuator 28c moves the pressure disk 203 in the other axial direction, the surface of the pressure disk 203 on the side of the first clutch disk 201 presses the first clutch disk 201 against the first clutch plate 205. Thus, the first clutch disk 201 and the first clutch plate 205 rotate together, and transmit the decelerated rotation to the output shaft 34. The rotation of the output shaft 34 is inputted from the pinion 35 to the ring gear 53, and transmitted to the differential gear device 51. At this time, the inner side rotation shaft 33i is rotated by the second speed reducing part G2, but the pressure disk 203 is positioned apart from the second clutch disk 202, so that it does not press the second clutch disk 202. While the second clutch disk 202 rotates together with the inner side rotation shaft 33i, it is apart from the second clutch plate 206 and idles. That is, the second clutch C2 does not transmit the rotation torque. As a result, the motor rotation speed is reduced by the first speed reducing part G1 with the predetermined first speed reduction ratio and transmitted to the outer side rotation shaft 33o.

Meanwhile, when the rotation speed of the differential gear device 51 is in a high-speed rotation region above the predetermined rotation speed, only the second clutch C2 transmits the rotation torque. Thus, even when the rotation speed of the differential gear device 51 is in the high-speed region, the rotation speed of the motor 11 can be provided in a highly-efficient region.

More specifically, the actuator 28c moves the pressure disk 203 in the one axial direction, the surface of the pressure disk 203 on the side of the second clutch disk 202 presses the second clutch disk 202 against the second clutch plate 206. Thus, the second clutch disk 202 and the second clutch plate 206 rotate together, and transmit the decelerated rotation to the output shaft 34. The rotation of the output shaft 34 is inputted from the pinion 35 to the ring gear 53, and transmitted to the differential gear device 51. At this time, the outer side rotation shaft 33o is rotated by the first speed reducing part G1, but the pressure disk 203 is positioned apart from the first clutch disk 201, so that it does not press the first clutch disk 201. While the first clutch disk 201 rotates together with the outer side rotation shaft 330, it is apart from the first clutch plate 205 and idles. That is, the first clutch C1 does not transmits the rotation torque. As a result, the motor rotation speed is reduced by the second speed reducing part G2 with the second speed reduction ratio higher than the first speed reduction ratio, and transmitted to the inner side rotation shaft 33i.

According to the sixth embodiment, the speed reducing part 31 has the motor side rotation member 18 serving as the input shaft to which the rotation is inputted from the motor, the double shaft 33 including the tube-shaped outer side rotation shaft 33o and the inner side rotation shaft 33i to which the outer side rotation shaft 33o is inserted, and arranged parallel to the motor side rotation member 18, the first speed reducing part G1 to reduce the rotation speed of the motor side rotation member 18 with the first speed reduction ratio and transmit it to the outer side rotation shaft 33o, the second speed reducing part G2 to reduce the rotation speed of the motor side rotation member 18 with the second speed reduction ratio different from the first speed reduction ratio and transmit it to the inner side rotation shaft 33i, and the output shaft 34 to transmit the rotation to the wheel. In addition, the connection/disconnection part 21 has the first clutch C1 to disconnect or connect the output shaft 34 from or to the outer side rotation shaft 33o, and the second clutch C2 to disconnect or connect the output shaft 34 from or to the inner side rotation shaft 33i. Thus, due to the double shaft structure including the tube-shaped outer side rotation shaft 33o and the inner side rotation shaft 33i inserted into the outer side rotation shaft, the two clutches C1 and C2 can be arranged on the double shaft 33, which is advantageous to the space limitations of the vehicle. Therefore, the electric motor drive device 6 can be miniaturized.

As an alternative example of the sixth working example, it may be such that the double shaft is arranged coaxially with the motor side rotation member 18, the double shaft always meshes with the output shaft 34 in the first speed reducing part and the second speed reducing part, and the first clutch and the second clutch are provided between the motor side rotation member 18 and the double shaft. This alternative example has been described in the first to fifth working examples.

In the alternative example, since the double shaft structure is directly connected to the motor output shaft, the rotation speed becomes high, which puts a heavy burden on an oil seal provided in each of the outer side rotation shaft and inner side rotation shaft.

In addition, in the alternative example, since the gears always mesh with each other in the speed reducing part and the rotation speed of the double shaft is high, the inner side rotation shaft is always rotated by the outer side rotation shaft at high speed in the case where the outer side rotation shaft serves as the power transmission passage. Therefore, due to the high rotation, a bearing loss, a gear loss, and an oil seal contact loss increase, which could cause meshing vibration of the gear.

In addition, in the alternative example, since the rotation speed of the connection/disconnection part also becomes high, the clutch disk and the clutch plate have to increase centrifugal strength, which could cause unbalance vibration.

Meanwhile, according to the sixth working example, since the electric motor drive device has the first speed reducing part G1 to reduce the rotation speed of the motor side rotation member 18 with the first speed reduction ratio, and the second speed reducing part G2 to reduce the rotation speed of the motor side rotation member 18 with the second speed reduction ratio different from the first speed reduction ratio, the rotation speed of the double shaft 33 can be lower than the rotation speed of the motor 11, which can reduce the burden on the oil seal provided in each of the outer side rotation shaft 33o and the inner side rotation shaft 33i in the double shaft structure.

Furthermore, according to the sixth working example, the rotation speed of the double shaft is lower than the rotation speed of the motor, which can reduce the bearing loss, gear loss, and oil seal contact loss, and prevent the meshing vibration of the gear.

Still furthermore, according to the sixth working example, since the rotation speed of the double shaft is lower than the rotation speed of the motor, it is not necessary to increase the centrifugal strength of each disk and each plate, which has an advantage in design. Thus, the unbalance vibration of the connection/disconnection part 21 can be avoided.

Still furthermore, according to the sixth working example, the motor side rotation member 18 is connected to the one end of the motor output shaft 15. Thus, the motor output shaft 15 and the motor side rotation member 18 is coaxially arranged and the speed reducing part 31 and the connection/disconnection part 21 can be collectively arranged on the axial one side of the motor 11, which is advantageous to the space limitations of the vehicle. Therefore, the electric motor drive device 6 can be miniaturized.

In addition, according to the sixth working example, the connection/disconnection part 21 is arranged at the one end part of the double shaft 33 on the side distant from the motor 11, of both ends of the double shaft, the speed reducing part 31 is arranged at the other end part of the double shaft 33 on the side close to the motor 11, of the both ends of the double shaft, the inner side rotation shaft 33i of the double shaft 33 is formed into the tube shape, and the output shaft 34 is inserted into the tube-shaped inner side rotation shaft 33i. Thus, the double shaft 33 and the output shaft 34 make a triple shaft structure, the pinion 35 is formed by projecting the output shaft 34 from the other end of the double shaft 33, so that the decelerated rotation can be extracted from the pinion 35. Therefore, the extraction position of the decelerated rotation can be provided between the motor 11 and the connection/disconnection part 21, that is, in the axial center of the electric motor drive device 6, which improves the arrangement balance of the drive shafts 59 and 60 connected to the wheels to distribute the decelerated rotation to the wheels. Furthermore, since the motor 11 and the speed reducing part 31 can be adjacently arranged, the inside of the motor 11 can be cooled down with oil cooling by introducing lubricant oil passing through the inside of the speed reducing part 31 into the motor 11.

Furthermore, although not shown in the drawing, the speed reducing part 31 may further include a third speed reducing part to reduce the rotation speed of the motor side rotation member 18 with a third speed reduction ratio different from the first speed reduction ratio and the second reduction ratio and transmit it to the second shaft. The third speed reducing part can be provided in the outer side rotation shaft 33*o*. The third speed reducing part can be selectively connected to the shaft with the conventional synchromesh mechanism. The third speed reducing part may be provided in the inner side rotation shaft 33*i*, and a fourth coupling part may be further provided. According to this embodiment, since the first to third speed reducing parts each having the different speed reduction ratio are provided, the electric motor can be operated at highly-efficient rotation speed, in response to low-speed running, middle-speed running, and high-speed running, which more improves the energy efficiency.

The first clutch C1 according to the sixth working example has the first clutch disk 201 serving as the first drive side friction element provided coaxially with the outer side rotation shaft 33*o* to integrally rotate therewith, the first clutch plate 205 serving as the first driven side friction element integrally rotating with the output shaft 34, and the pressure disk 203 serving as the first pressure member to press the first clutch disk 201 against the first clutch plate 205 to fasten them. The second clutch C2 has the second clutch disk 202 serving as the second drive side friction element provided coaxially with the inner side rotation shaft 33*i* to integrally rotate therewith, the second clutch plate 206 serving as the second driven side friction element integrally rotating with the output shaft 34, and the pressure disk 203 serving as the second pressure member to press the second clutch disk 202 against the second clutch plate 206 to fasten them. Thus, a power transmission passage to transmit the rotation from the motor 11 to the wheel through the inner side rotation shaft 33*i* or the outer side rotation shaft 33*o* can be switched by switching the friction elements. Therefore, the present invention can eliminate the shock which is generated due to switching between the first and second speed reducing parts in the case where the two-way clutch is used in the conventional electric motor drive device.

According to the sixth working example, the first pressure member and the second pressure member are provided on the one surface and the other surface of the common pressure disk 203, the first clutch disk 201 and the first clutch plate 205 are arranged on the one surface side of the pressure disk 203, and the second clutch disk 202 and the second clutch plate 206 are arranged on the other surface side of the pressure disk 203, and the connection/disconnection part 21 further has the actuator unit 28 to move the pressure disk to the one surface side and the other surface side. Thus, since the first clutch disk 201 is arranged on the one surface side of the pressure disk 203, and the second clutch disk 202 is arranged on the other surface side of the pressure disk 203, so that the first speed reducing part G1 and the second speed reducing part G2 can be switched by moving the common pressure disk 203 by the one actuator 28*c*. Therefore, the electric motor drive device 6 can be further miniaturized. In addition, since the pressure disk 203 selectively presses the first clutch disk 201 or the second clutch disk 202, which has an advantage in reduction in component number and cost.

The actuator 28*c* according to the sixth working example is arranged on the side distant from the speed reducing part 31, of the axial both sides of the connection/disconnection part 21. Thus, the actuator 28*c* is arranged at the one end part of the electric motor drive device 6, which can improve assembly efficiency of the electric motor drive device 6.

Alternatively, although not shown in the drawing, the actuator 28*c* may be arranged between the connection/disconnection part 21 and the speed reducing part 31. In this case, the actuator is incorporated in a middle part of the electric motor drive device 6, which can satisfy the space limitations of the vehicle.

In the electric motor drive device 6, the other end part of the double shaft 33 is arranged in axially the same position as the one end part of the motor side rotation member 18 corresponding to the opposite-side shaft. In addition, the one end part of the double shaft extends away from the motor 11. Thus, the output shaft 34 is arranged coaxially with the double shaft 33. As an alternative example, although not shown in the drawing, the output shaft may be arranged so as to coaxially abut on the other end of the double shaft. In this alternative example, the motor, the speed reducing part, and the connection/disconnection part are arranged in this order in the axial direction of the double shaft, so that the decelerated rotation can be extracted from the one end of the connection/disconnection part arranged most distant from the motor.

Figure 7:
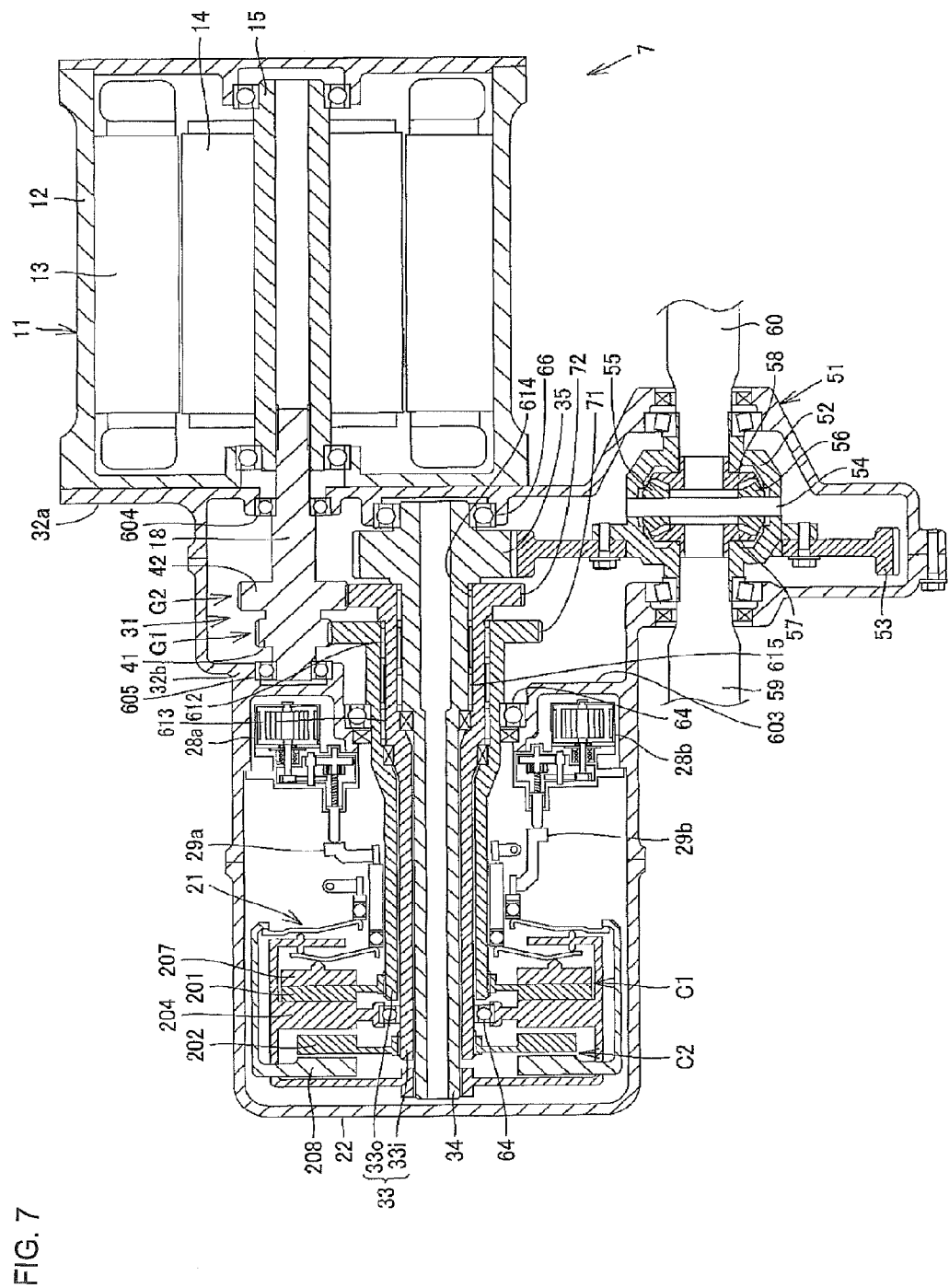
FIG. 7 is a main part development cross-sectional view showing an electric motor drive device according to a seventh working example.

FIG. 7 is a main part development cross-sectional view showing an electric motor drive device according to a seventh working example. Since a basic configuration of the seventh working example is in common with the sixth working example, the same member is marked with the common reference, its description is omitted, and a different configuration will be described.

The electric motor drive device 7 of the seventh working example differs from the electric motor drive device 6 in that a pressure member of a connection/disconnection part 21 is divided into two, and just one clutch plate is provided as a drive side friction element.

A description will be made of clutches C1 and C2 of the connection/disconnection part 21 with reference to FIG. 7. A center plate 204 is arranged between a first clutch disk 201 serving as a drive side friction element of the clutch C1 and a second clutch disk 202 serving as a drive side friction element of the clutch C2. Each side of the center plate 204 serving as the common driven side friction element has a friction material. A front surface of the first clutch disk 201 opposed to the center plate 204 has a friction material. A first pressure disk 207 is arranged on the side of a back surface of the first clutch disk 201. The center plate 204, the first clutch disk 201, and the first pressure disk 207 function as the first clutch C1.

A front surface of the second clutch disk 202 opposed to the center plate 204 has a friction material. A second pressure disk 208 is arranged on the side of a back surface of the second clutch disk 202. The center plate 204, the second clutch disk 202, and the second pressure disk 208 function as the second clutch C2.

In the connection/disconnection part 21, the first pressure disk 207 is arranged on the side closest to the motor 11, and the first clutch disk 201, the center plate 204, the second clutch disk 202, and the second pressure disk 208 are arranged in this order so as to be away from the motor 11. Each of them has a center hole to which a double shaft 33 and an output shaft 34 are inserted. That is, the two clutches C1 and C2 are arranged on the double shaft 33. The center plate 204 is rotatably supported on an outer periphery of the other end part of an inner side rotation shaft 33*i* via a bearing 64.

Two actuators 28*a* and 28*b* are arranged between the connection/disconnection part 21 and a speed reducing part 31.

The first actuator 28a is connected to the first pressure disk 207 through a link member 29a. The second actuator 28b is connected to the second pressure disk 208 through a link member 29b.

Hereinafter, an operation of the above electric motor drive device 7 will be described. When the motor 11 is turned on and a motor output shaft 15 is driven to rotate, a motor side rotation member 18 rotates together with the motor output shaft 15. When the rotation speed of a differential gear device 51 is in a predetermined low-speed rotation region, the first actuator 28a connects the first clutch C1, the second actuator 28b disconnects the second clutch C2, and the rotation drive of the motor 11 is reduced by the first speed reducing part G1 and transmitted to the differential gear device 51. Thus, even when the rotation speed of the differential gear device 51 is in the low-speed region, the rotation speed of the motor 11 can be provided in a highly-efficient region.

Meanwhile, when the rotation speed of the differential gear device 51 is in a predetermined high-speed rotation region, the first actuator 28a disconnects the first clutch C1, and the second actuator 28b connects the second clutch C2, and the rotary drive of the motor 11 is reduced by the second speed reducing part G2 and transmitted to the differential gear device 51. Thus, when the rotation speed of the differential gear device 51 is in the high-speed region, the rotation speed of the motor 11 can be provided in a highly-efficient region.

According to the seventh working example, the driven side friction element of the first clutch C1 and the second driven side friction element of the second clutch C2 are provided on the one surface and the other surface of the center plate 204 shared by the first clutch C1 and the second clutch C2. The first clutch disk 201 serving as the first drive side friction element and the first pressure disk 207 serving as the first pressure member are arranged on the one surface side of the center plate 204. The second clutch disk 202 serving as the second drive side friction element and the second pressure disk 208 serving as the second pressure member are arranged on the other surface side of the center plate 204. Thus, the electric motor drive device can be further miniaturized, which is advantageous to the space limitations of the vehicle.

In addition, according to the seventh working example, the connection/disconnection part 21 further has the first actuator 28a to operate the first pressure disk 27, and the second actuator 28b to operate the second pressure disk 208, and the first actuator 28a and the second actuator 28b are arranged between the connection/disconnection part 21 and the speed reducing part 31. Thus, the actuators are incorporated in a middle part of the electric motor drive device 7, which satisfies the space limitations of the vehicle.

While the embodiments of the present invention have been described with reference to the drawings in the above, the present invention is not limited to the above-illustrated embodiments. Various kinds of modifications and variations may be added to the illustrated embodiments within the same or equal scope of the present invention.

Industrial Applicability

The electric motor drive device according to the present invention can be advantageously employed in an electric car having an electric motor as a drive source, and a hybrid vehicle having an electric motor and an internal-combustion engine.

Explanation of References 1, 2, 3, 4, 5, 6, 7 ELECTRIC MOTOR DRIVE DEVICE, 11 MOTOR, 12 MOTOR CASING, 13 STATOR, 14 ROTOR, 15 MOTOR OUTPUT SHAFT, 18 MOTOR SIDE ROTATION MEMBER, 20 PRESSURE DISK, 21 CONNECTION/DISCONNECTION PART, 22 CONNECTION/DISCONNECTION PART CASING, 23 CENTER PLATE, 24 SECOND CLUTCH DISK, 25 FIRST CLUTCH DISK, 26 SECOND PRESSURE DISK, 27 FIRST PRESSURE DISK, 28 ACTUATOR UNIT, 31 SPEED REDUCING PART, 32 CASING, 33 FIRST SHAFT (DOUBLE SHAFT), 331 INNER SIDE ROTATION SHAFT, 330 OUTER SIDE ROTATION SHAFT, 34 SECOND SHAFT (OUTPUT SHAFT), 35 PINION, 51 DIFFERENTIAL GEAR DEVICE, 231 FIRST PLATE, 232 SECOND PLATE

The invention claimed is:

1. An electric motor drive device comprising a motor, a speed reducing part to reduce speed of a rotation outputted from said motor and transmit it to the side of a wheel, and a connection/disconnection part to disconnect or connect rotation transmission of said speed reducing part, wherein
said speed reducing part has an input shaft to input the rotation from the motor, an output shaft to output the rotation to the side of the wheel, a double shaft arranged coaxially with the one of said input shaft and said output shaft and including a tube-shaped outer side rotation shaft and an inner side rotation shaft inserted into said outer side rotation shaft, an opposite-side shaft connected to the other one of said input shaft and said output shaft, a first speed reducing part including a plurality of rotation elements to reduce speed of the rotation on the side of the motor with a first speed reduction ratio, between one of said outer side rotation shaft and said inner side rotation shaft, and said opposite-side shaft and transmit it to the side of the wheel, and a second speed reducing part including a plurality of rotation elements to reduce the speed of the rotation on the side of the motor with a second speed reduction ratio different from said first speed reduction ratio, between the other one of said outer side rotation shaft and said inner side rotation shaft, and said opposite-side shaft and transmit it to the side of the wheel, and
said connection/disconnection part has an inner side rotation shaft clutch to disconnect or connect rotation transmission between said inner side rotation shaft and said input shaft or said output shaft coaxially arranged with each other, and an outer side rotation shaft clutch to disconnect or connect rotation transmission between said outer side rotation shaft and said input shaft or said output shaft coaxially arranged with each other.

2. The electric motor drive device according to claim 1, wherein
said input shaft of the speed reducing part is coaxially arranged with said double shaft,
said opposite-side shaft extends parallel to said double shaft,
said output shaft of the speed reducing part is connected to said opposite-side shaft,
said inner side rotation shaft clutch disconnects or connects rotation transmission between said inner side rotation shaft of the double shaft and said input shaft, and
said outer side rotation shaft clutch disconnects or connects rotation transmission between said outer side rotation shaft of the double shaft and said input shaft.

3. The electric motor drive device according to claim 2, wherein
arrangement of said motor, said connection/disconnection part, and said speed reducing part is provided such that the motor, the connection/disconnection part, and the speed reducing part are arranged in this order in an axial direction of said double shaft.

4. The electric motor drive device according to claim 2, wherein said speed reducing part further has a third speed reducing part including a plurality of rotation elements to reduce the speed of the rotation on the side of the motor with a third speed reduction ratio different from said first speed reduction ratio and said second speed reduction ratio, between the one of said outer side rotation shaft and said inner side rotation shaft, and said opposite-side shaft and transmit it to the side of the wheel.

5. The electric motor drive device according to claim 2, wherein said inner side rotation shaft clutch has a first motor side friction element integrally rotating with said input shaft, a first shaft side friction element integrally rotating with said inner side rotation shaft, and a first pressure member to press one of said first shaft side friction element and said first motor side friction element against the other thereof to fasten them, and said outer side rotation shaft clutch has a second motor side friction element integrally rotating with said input shaft, a second shaft side friction element integrally rotating with said outer side rotation shaft, and a second pressure member to press the one of said second shaft side friction element and said second motor side friction element against the other thereof to fasten them.

6. The electric motor drive device according to claim 5, wherein said speed reducing part provided astride said double shaft and said opposite-side shaft has a smaller outer diameter dimension on the side of the double shaft than an outer diameter dimension of said connection/disconnection part provided coaxially with said double shaft, and said connection/disconnection part further has an actuator to operate said first pressure member and said second pressure member, and said actuator is arranged on the outer diameter side of said speed reducing part provided around the double shaft.

7. The electric motor drive device according to claim 5, wherein said first pressure member and said second pressure member are provided as one surface and the other surface of a common pressure disk, said first motor side friction element and said first shaft side friction element are arranged on the one surface side of said pressure disk, said second motor side friction element and said second shaft side friction element are arranged on the other surface side of said pressure disk, and said connection/disconnection part further has an actuator to move said pressure disk to the one surface side and the other surface side.

8. The electric motor drive device according to claim 7, wherein said speed reducing part provided astride said double shaft and said opposite shaft has a smaller outer diameter dimension on the side of the double shaft than an outer diameter dimension of said connection/disconnection part provided coaxially with said double shaft, and said actuator is arranged on the outer diameter side of said speed reducing part provided around the double shaft, and arranged in roughly the same position as said speed reducing part in an axial direction.

9. The electric motor drive device according to claim 2, wherein said inner side rotation shaft is formed into a tube shape, said input shaft projects from said motor to the axial one side and is inserted to said inner side rotation shaft, said inner side rotation shaft clutch is provided in an end part of said inner side rotation shaft on the side distant from the motor, and said outer side rotation shaft clutch is provided in an end part of said outer side rotation shaft on the side distant from the motor.

10. The electric motor drive device according to claim 1, wherein said output shaft is arranged coaxially with said double shaft, said opposite-side shaft extends parallel to said double shaft, said inner side rotation shaft clutch disconnects or connects rotation transmission between said inner side rotation shaft and said output shaft, and said outer side rotation shaft clutch disconnects or connects rotation transmission between said outer side rotation shaft and said output shaft.

11. The electric motor drive device according to claim 10, wherein said input shaft of the speed reducing part is connected to said output shaft of the motor.

12. The electric motor drive device according to claim 11, wherein one end part of said double shaft is arranged in axially the same position as said opposite-side shaft, and the other end part of said double shaft extends in a direction away from said motor, said first speed reducing part and said second speed reducing part are arranged in the one end part of said double shaft, said connection/disconnection part is arranged in the other end part of said double shaft, and the inner side rotation shaft of said double shaft is formed into a tube shape, and said output shaft is inserted in the tube-shaped inner side rotation shaft and projects from said one end of the inner side rotation shaft.

13. The electric motor drive device according to claim 12, wherein said outer side rotation shaft clutch has a first drive side friction element integrally rotating with said outer side rotation shaft, a first driven side friction element integrally rotating with said opposite-side shaft, and a first pressure member to press one of said first drive side friction element and said first driven side friction element against the other thereof to fasten them, and said inner side rotation shaft clutch has a second drive side friction element integrally rotating with said inner side rotation shaft, a second driven side friction element integrally rotating with said opposite-side shaft, and a second pressure member to press one of said second drive side friction element and said second driven side friction element against the other thereof to fasten them.

14. The electric motor drive device according to claim 13, wherein said first pressure member and said second pressure member are provided as one surface and the other surface of a common pressure disk, said first drive side friction element and said first driven side friction element are arranged on the one surface side of said pressure disk, said second drive side friction element and said second driven side friction element are arranged on the other surface side of said pressure disk, and said connection/disconnection part further has an actuator to move said pressure disk to the one surface side and to the other surface side.

15. The electric motor drive device according to claim 14, wherein said actuator is arranged on the side distant from said speed reducing part, of axial both sides of said connection/disconnection part.

16. The electric motor drive device according to claim 14, wherein said actuator is arranged between said connection/disconnection part and said speed reducing part.

17. The electric motor drive device according to claim 13, wherein said first driven side friction element and said second driven side friction element are provided as one surface and the other surface of a common center plate, said first drive side friction element and said first pressure member are arranged on the one surface side of said center plate, and said second drive side friction element and said second pressure member are arranged on the other surface side of said center plate.

18. The electric motor drive device according to claim 13, wherein said connection/disconnection part further has a first actuator to operate said first pressure member, and a second actuator to operate said second pressure member, and said first actuator and said second actuator are arranged between said connection/disconnection part and said speed reducing part.

* * * * *